US012669815B2

(12) United States Patent
Richman et al.

(10) Patent No.: US 12,669,815 B2
(45) Date of Patent: Jun. 30, 2026

(54) INTERFACES AND CONTROL OF AERIAL VEHICLE FOR AUTOMATED MULTIDIMENSIONAL VOLUME SCANNING

(71) Applicant: Skydio, Inc., Redwood City, CA (US)

(72) Inventors: Brian Richman, San Francisco, CA (US); Matthew Thomas Beaudouin-Lafon, La Jolla, CA (US); Charles Vanschoonhoven Wood, Cazenovia, NY (US); Peter Benjamin Henry, San Francisco, CA (US); Jack Louis Zhu, San Mateo, CA (US); Harrison Zheng, Palo Alto, CA (US); Hayk Martirosyan, San Francisco, CA (US); Matthew Donahoe, Redwood City, CA (US); Abraham Galton Bachrach, Emerald Hills, CA (US); Adam Parker Bry, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 313 days.

(21) Appl. No.: 17/830,472

(22) Filed: Jun. 2, 2022

(65) Prior Publication Data

US 2022/0390940 A1     Dec. 8, 2022

Related U.S. Application Data

(60) Provisional application No. 63/195,732, filed on Jun. 2, 2021.

(51) Int. Cl.
 *G05D 1/00* (2024.01)
 *G06F 3/04847* (2022.01)
 (Continued)

(52) U.S. Cl.
 CPC ......... *G05D 1/0016* (2013.01); *G05D 1/0044* (2013.01); *G06F 3/04847* (2013.01);
 (Continued)

(58) Field of Classification Search
 CPC .. G05D 1/0016; G05D 1/0044; H04N 13/204; H04N 13/243; H04N 13/271;
 (Continued)

(56) References Cited

U.S. PATENT DOCUMENTS

| | | | |
|---|---|---|---|
| 11,823,332 B2 * | 11/2023 | Mathur | G02B 27/017 |
| 2018/0130255 A1 * | 5/2018 | Hazeghi | H04N 13/271 |

(Continued)

*Primary Examiner* — Adam M Alharbi

(57) ABSTRACT

In some examples, a computing apparatus may include one or more non-transitory computer-readable storage media and program instructions stored on the one or more computer-readable storage media that, when executed by one or more processors, direct the computing apparatus to perform various steps. For example, the program instructions may continually present a graphical user interface (GUI) at the computing apparatus including a display of a current view of the physical environment from a perspective of an aerial vehicle. The program instructions may detect user interactions with the GUI while the aerial vehicle is in flight. The user interactions may include instructions directing the aerial vehicle to maneuver within the physical environment and configure parameters for scanning a three-dimensional (3D) scan volume. The program instruction may then transmit, to the aerial vehicle, data encoding the instructions for performing a 3D scan of the 3D scan volume.

24 Claims, 27 Drawing Sheets

(51) Int. Cl.
  *H04N 13/204* (2018.01)
  *B64U 10/14* (2023.01)
  *B64U 101/30* (2023.01)

(52) U.S. Cl.
  CPC ........... *H04N 13/204* (2018.05); *B64U 10/14* (2023.01); *B64U 2101/30* (2023.01); *B64U 2201/10* (2023.01)

(58) Field of Classification Search
  CPC ........ H04N 2013/0081; G06F 3/04847; G06F 3/04883; B64U 2201/10; B64U 10/14; B64U 2101/30; B64U 2201/20; B64U 2201/123; B64C 39/024
  See application file for complete search history.

(56) References Cited

U.S. PATENT DOCUMENTS

| | | | |
|---|---|---|---|
| 2019/0011921 A1* | 1/2019 | Wang ...................... | G06T 7/246 |
| 2019/0385322 A1* | 12/2019 | Gu .......................... | G01C 11/06 |
| 2022/0130145 A1* | 4/2022 | Connary ............... | G05D 1/101 |

* cited by examiner

500

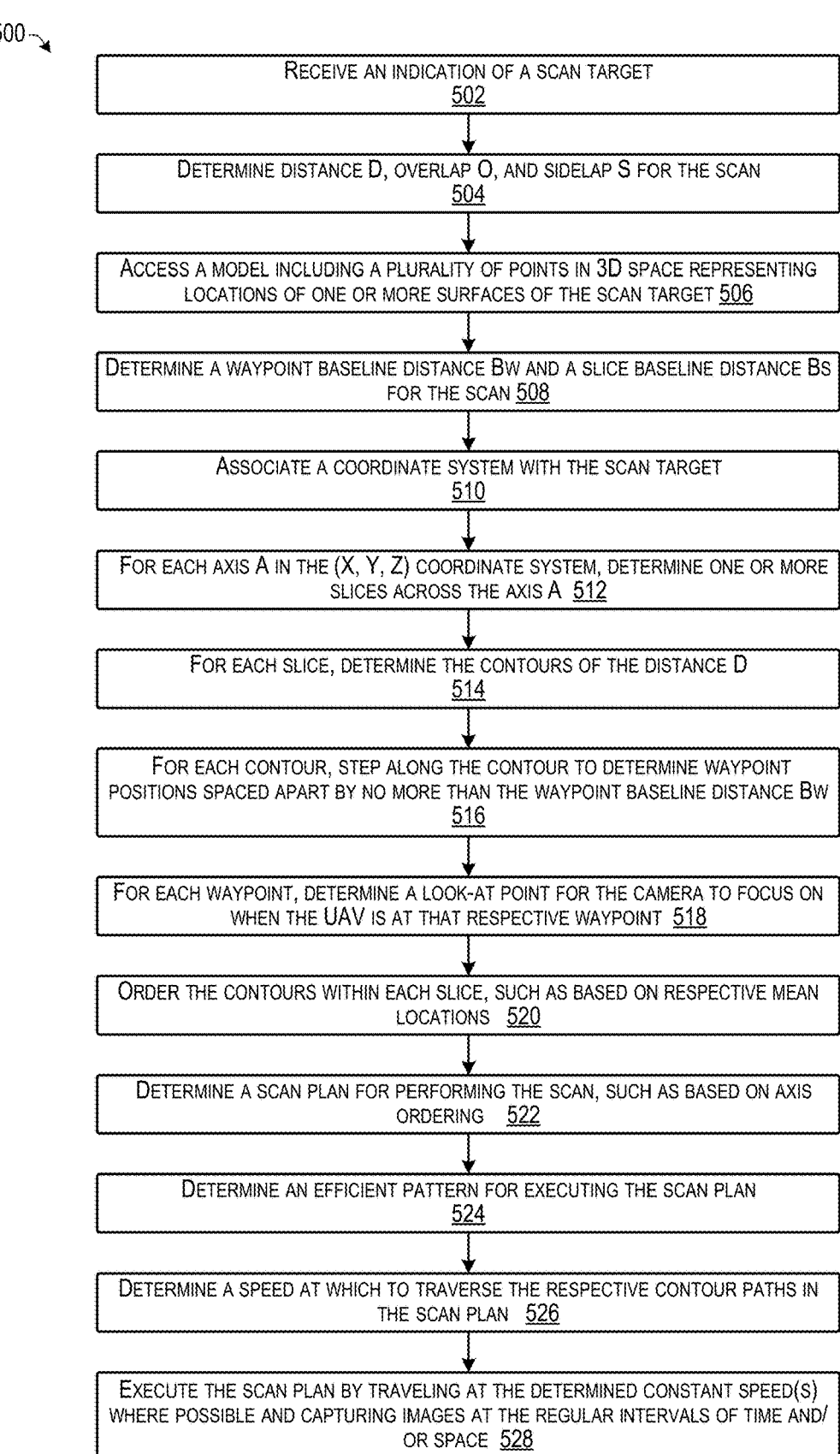

RECEIVE AN INDICATION OF A SCAN TARGET
502

DETERMINE DISTANCE D, OVERLAP O, AND SIDELAP S FOR THE SCAN
504

ACCESS A MODEL INCLUDING A PLURALITY OF POINTS IN 3D SPACE REPRESENTING LOCATIONS OF ONE OR MORE SURFACES OF THE SCAN TARGET 506

DETERMINE A WAYPOINT BASELINE DISTANCE Bw AND A SLICE BASELINE DISTANCE Bs FOR THE SCAN 508

ASSOCIATE A COORDINATE SYSTEM WITH THE SCAN TARGET
510

FOR EACH AXIS A IN THE (X, Y, Z) COORDINATE SYSTEM, DETERMINE ONE OR MORE SLICES ACROSS THE AXIS A 512

FOR EACH SLICE, DETERMINE THE CONTOURS OF THE DISTANCE D
514

FOR EACH CONTOUR, STEP ALONG THE CONTOUR TO DETERMINE WAYPOINT POSITIONS SPACED APART BY NO MORE THAN THE WAYPOINT BASELINE DISTANCE Bw
516

FOR EACH WAYPOINT, DETERMINE A LOOK-AT POINT FOR THE CAMERA TO FOCUS ON WHEN THE UAV IS AT THAT RESPECTIVE WAYPOINT 518

ORDER THE CONTOURS WITHIN EACH SLICE, SUCH AS BASED ON RESPECTIVE MEAN LOCATIONS 520

DETERMINE A SCAN PLAN FOR PERFORMING THE SCAN, SUCH AS BASED ON AXIS ORDERING 522

DETERMINE AN EFFICIENT PATTERN FOR EXECUTING THE SCAN PLAN
524

DETERMINE A SPEED AT WHICH TO TRAVERSE THE RESPECTIVE CONTOUR PATHS IN THE SCAN PLAN 526

EXECUTE THE SCAN PLAN BY TRAVELING AT THE DETERMINED CONSTANT SPEED(S) WHERE POSSIBLE AND CAPTURING IMAGES AT THE REGULAR INTERVALS OF TIME AND/OR SPACE 528

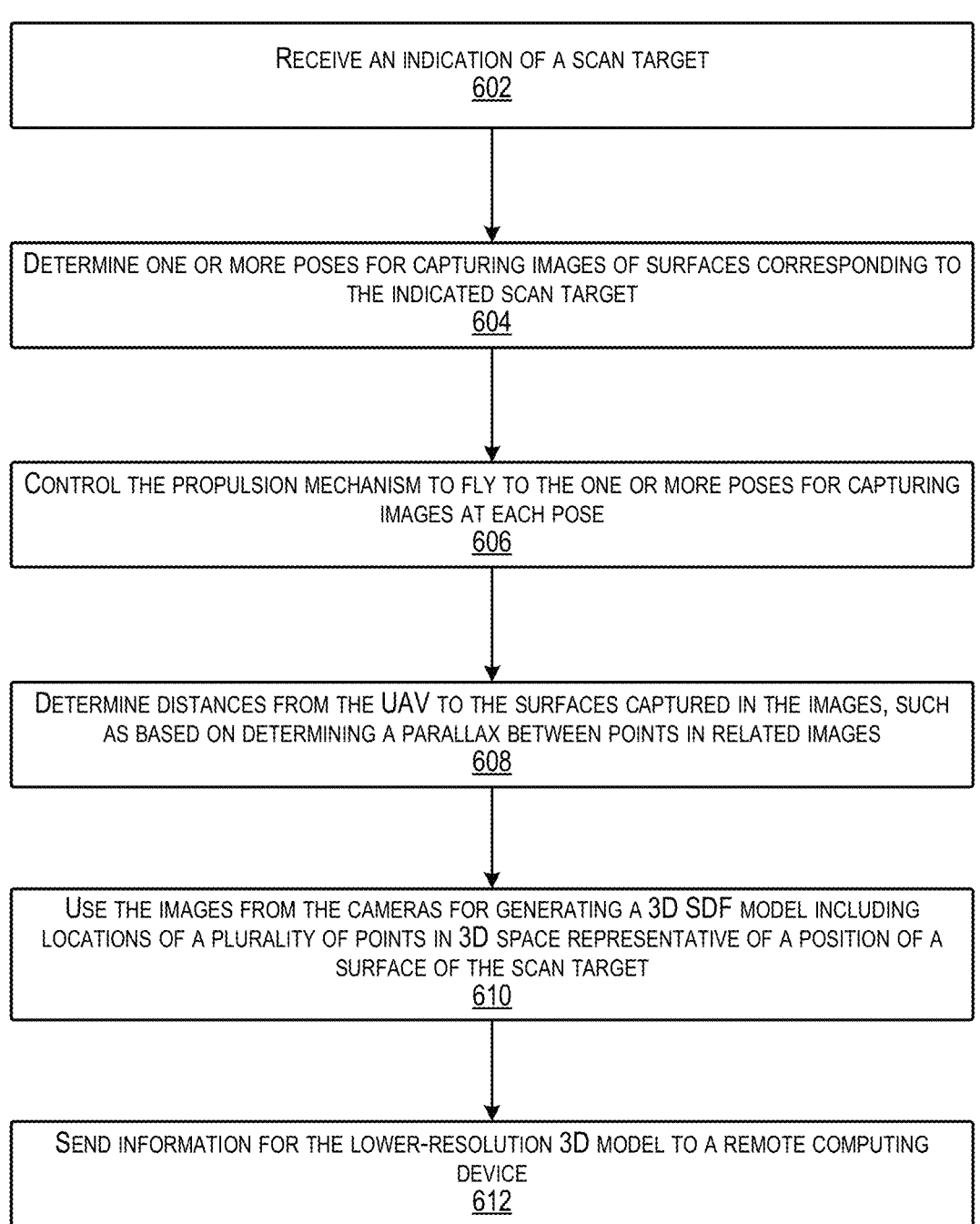

RECEIVE AN INDICATION OF A SCAN TARGET
602

DETERMINE ONE OR MORE POSES FOR CAPTURING IMAGES OF SURFACES CORRESPONDING TO THE INDICATED SCAN TARGET
604

CONTROL THE PROPULSION MECHANISM TO FLY TO THE ONE OR MORE POSES FOR CAPTURING IMAGES AT EACH POSE
606

DETERMINE DISTANCES FROM THE UAV TO THE SURFACES CAPTURED IN THE IMAGES, SUCH AS BASED ON DETERMINING A PARALLAX BETWEEN POINTS IN RELATED IMAGES
608

USE THE IMAGES FROM THE CAMERAS FOR GENERATING A 3D SDF MODEL INCLUDING LOCATIONS OF A PLURALITY OF POINTS IN 3D SPACE REPRESENTATIVE OF A POSITION OF A SURFACE OF THE SCAN TARGET
610

SEND INFORMATION FOR THE LOWER-RESOLUTION 3D MODEL TO A REMOTE COMPUTING DEVICE
612

FIG. 6

CONTROLLER 104

PROCESSOR(S)
1102

COMPUTER-READABLE MEDIA 1104

USER APPLICATION
1108

IMAGES 118

3D MODEL INFORMATION 120

OTHER PROGRAMS AND DATA
1110

DISPLAY 124

I/O DEVICES
1112

COMMUNICATION INTERFACE(S)
1106

1200

RECEIVE AN INDICATION TO ENTER A 3D SCAN MODE
1202

NAME THE SCAN OR SCAN SITE
1204

LAUNCH THE AERIAL VEHICLE
1206

CONFIGURE SCAN SETTINGS (OR PARAMETERS) IN FLIGHT
1208

REVIEW OR EDIT SCAN SETTINGS (OR PARAMETERS)
1210

SCAN OF 3D VOLUME
1212

MANUALLY CAPTURE PHOTOS (OPTIONAL)
1214

COMPLETE SCAN
1216

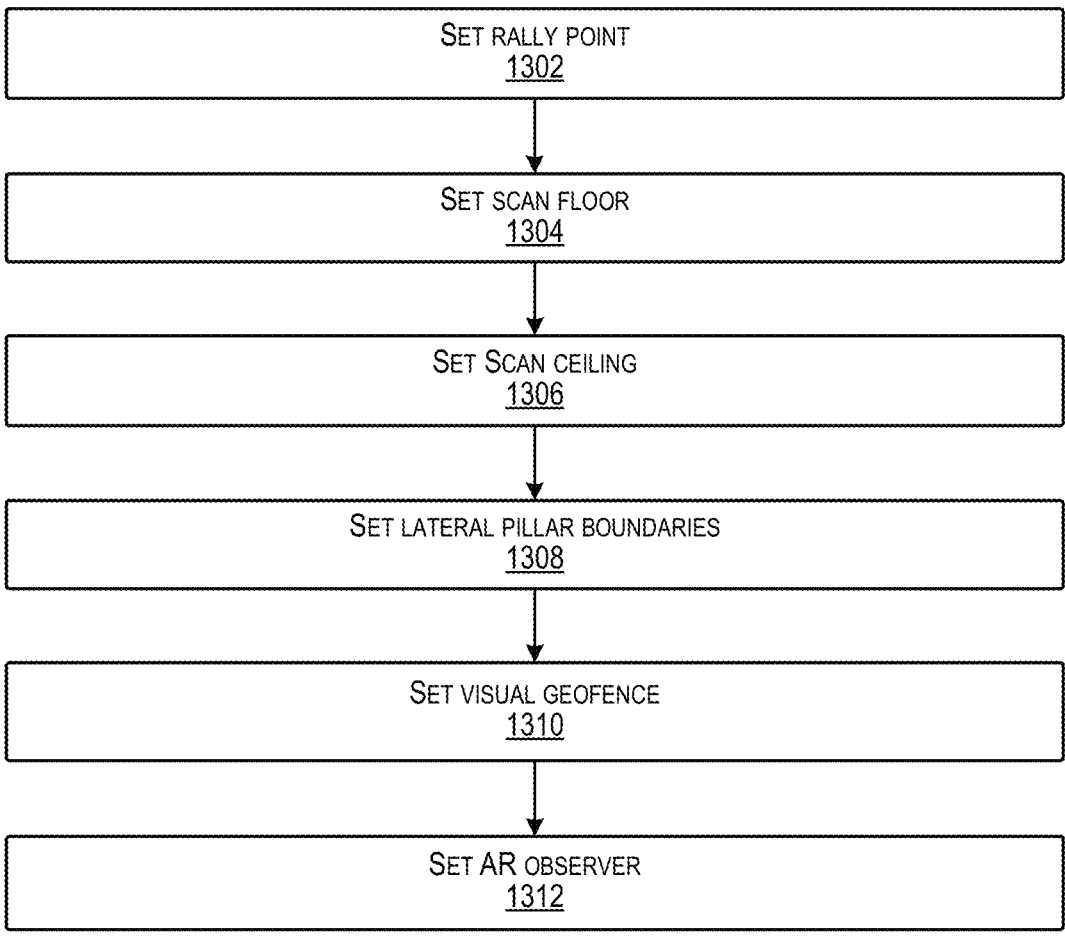
FIG. 13

AR Coverage Mesh

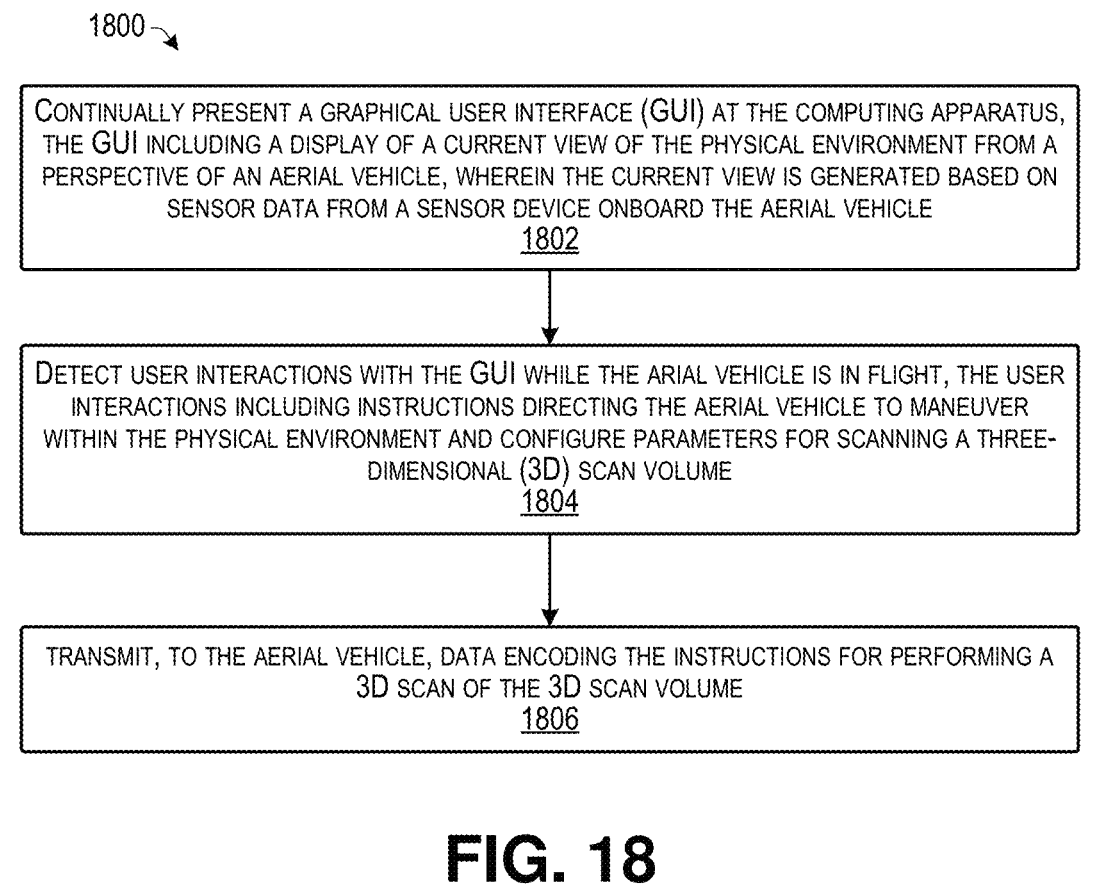

1800

CONTINUALLY PRESENT A GRAPHICAL USER INTERFACE (GUI) AT THE COMPUTING APPARATUS, THE GUI INCLUDING A DISPLAY OF A CURRENT VIEW OF THE PHYSICAL ENVIRONMENT FROM A PERSPECTIVE OF AN AERIAL VEHICLE, WHEREIN THE CURRENT VIEW IS GENERATED BASED ON SENSOR DATA FROM A SENSOR DEVICE ONBOARD THE AERIAL VEHICLE
1802

DETECT USER INTERACTIONS WITH THE GUI WHILE THE ARIAL VEHICLE IS IN FLIGHT, THE USER INTERACTIONS INCLUDING INSTRUCTIONS DIRECTING THE AERIAL VEHICLE TO MANEUVER WITHIN THE PHYSICAL ENVIRONMENT AND CONFIGURE PARAMETERS FOR SCANNING A THREE-DIMENSIONAL (3D) SCAN VOLUME
1804

TRANSMIT, TO THE AERIAL VEHICLE, DATA ENCODING THE INSTRUCTIONS FOR PERFORMING A 3D SCAN OF THE 3D SCAN VOLUME
1806

FIG. 18

INTERFACES AND CONTROL OF AERIAL VEHICLE FOR AUTOMATED MULTIDIMENSIONAL VOLUME SCANNING

CROSS REFERENCE TO RELATED APPLICATION

This claims priority to and benefit from U.S. Provisional Patent Application No. 63/195,732, filed on Jun. 2, 2021, titled "INTERFACES AND CONTROL OF AERIAL VEHICLES FOR AUTOMATED MULTIDIMENSIONAL VOLUME SCANNING IN PHYSICAL ENVIRON-MENTS" which is expressly incorporated by reference herein.

BACKGROUND

Unmanned aerial vehicles (UAVs), sometimes referred to as "drones", typically include one or more cameras for capturing images of objects during flight. For example, such UAVs may be used to capture images from vantage points that would otherwise be difficult to reach. Conventionally, UAVs have been controlled by pilots on the ground for capturing images of desired targets. However, capturing images of the surface of a target object at a desired distance from the surface and at a desired resolution and accuracy of coverage can be tedious for a human pilot.

BRIEF DESCRIPTION OF THE DRAWINGS

The detailed description is set forth with reference to the accompanying figures. In the figures, the leftmost digit(s) of a reference number identifies the figure in which the reference number first appears. The use of the same reference numbers in different figures indicates similar or identical items or features.

FIG. 5 is a flow diagram illustrating an example process for scanning a scan target according to some implementations.

FIG. 6 is a flow diagram illustrating an example process for generating a 3D model of a scan target according to some implementations.

FIG. 13 is a flow diagram illustrating an example process for configuring parameters (or settings) for scanning a 3D scan volume according to some implementations.

FIG. 18 is a flow diagram illustrating an example process for scanning a scan target (or scan volume) according to some implementations.

DETAILED DESCRIPTION

Figure 1:
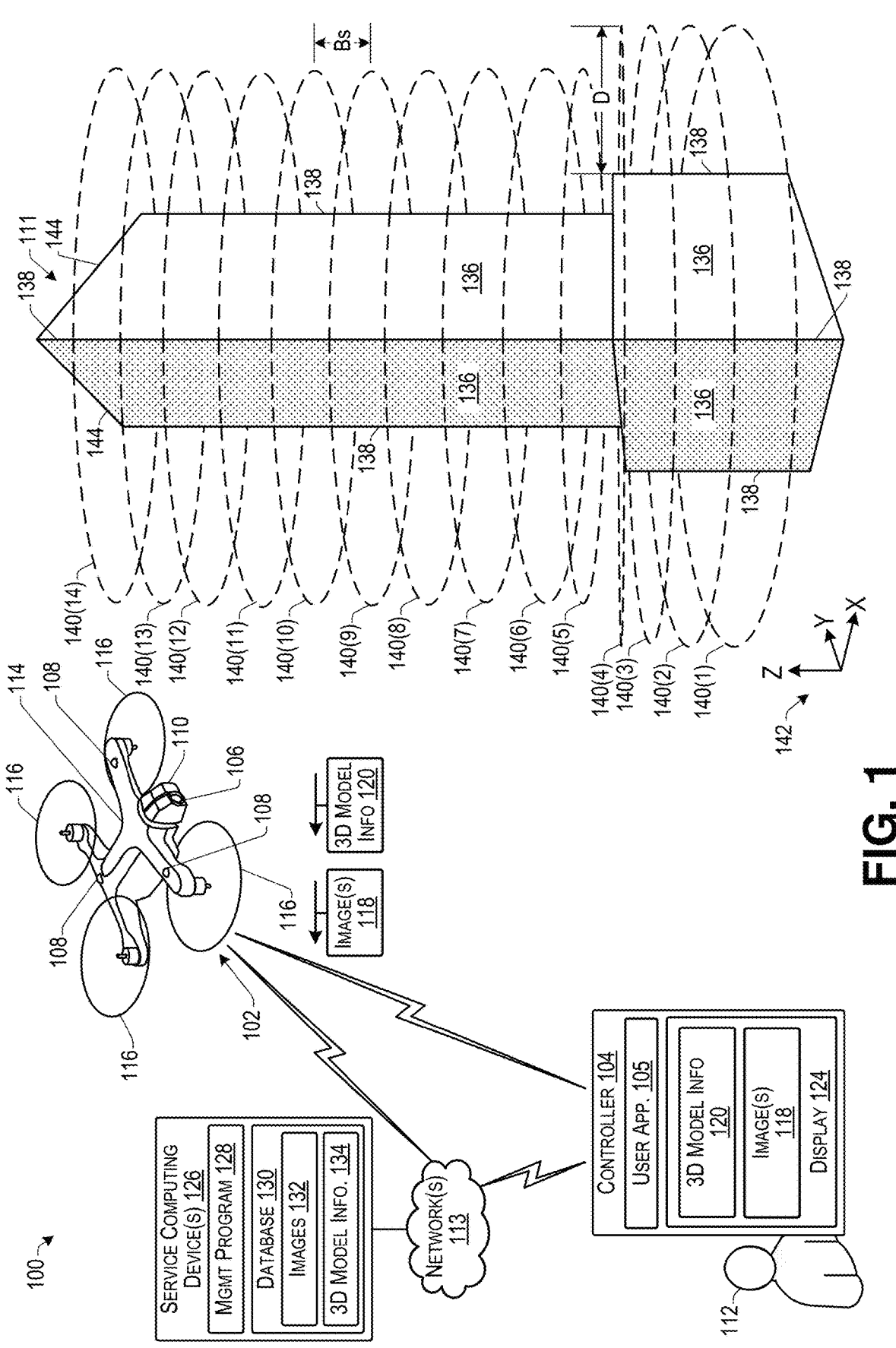
FIG. 1 illustrates an example system including an unmanned aerial vehicle (UAV) able to capture images according to some implementations.

Some implementations herein are directed to techniques and arrangements for configuring a UAV to scan three-dimensional (3D) scan targets, such as structures, buildings, bridges, pipelines, equipment, sites, scenes, geographic features, or any other object that may be designated as scan target by an operator. For instance, the UAV may be configurable to scan a scan target autonomously based on an initial indication of the scan target. The scanning may include capturing a sequence of images of the surface of the indicated scan target at a desired distance from the surface. The UAV may autonomously capture the images along a series of slices of the scan target in a thorough and repeatable manner. The UAV is able to capture scan targets having complex geometries, such as scan targets that include concavities, irregular and oblique surfaces and features, openings, asymmetric geometries, and so forth. In some cases, the captured images may be used for generating a 3D model of the scan target, or for any of various other end uses.

As one example, the UAV may be configured to traverse paths corresponding to a plurality of virtual contours around the scan target at a selected distance from the surface of the scan target (sometimes referred to herein as a baseline distance). The UAV may determine the virtual contours by dividing the scan target into a series of slices taken across an axis of the scan target. As one example, the UAV may associate a coordinate system (such as an x, y, z coordinate system) with the scan target, and may divide the scan target into a plurality of slices across at least one axis of the coordinate system. The UAV may determine a contour for each slice based on the selected distance and a detected location of the surface of the scan target (aka the zero contour). Further, the UAV may determine waypoints and look-at points for each contour. Each waypoint may be an image capture location at which the UAV captures an image of the surface of the scan target. The UAV may capture images of the scan target in a methodical manner by traveling along the plurality of contours determined for the scan target in a methodical and sequential manner, such as by capturing images along first contour of a first slice, then moving to the next adjacent slice, capturing images along the contour determined for that slice, moving to the next adjacent slice, and so forth, until all the desired portions of the scan target have been captured.

Each slice may be equated to a two-dimensional (2D) contour in a plane at the location in space of that particular slice. The UAV may traverse that contour as a travel path with the camera pointed at the scan target for capturing images of the surface of the scan target corresponding to the slice location. For example, the contour may essentially conform to the shape of the surface of the scan target at the location in space of that slice, and may form a path for the UAV to traverse at the selected distance from the surface of the scan target while capturing images of the surface of the scan target. The UAV may select a pattern for traversing the contours that enables the UAV to optimally travel at a constant speed while capturing images at regular intervals.

The distance between the slices may be determined based at least on the field of view of the camera onboard the UAV that is used to capture the images, as well as the selected distance of the travel path from the surface of the scan target, and the desired level of side overlap (sidelap) between adjacent slices for the captured images. The distance of the camera from the surface of the scan target may be selected based at least on the capabilities of the camera on the UAV and a desired degree of detail for the captured images. For example, the desired degree of detail, such as resolution, sharpness, exposure time, and the like, may depend at least in part on the subsequent intended use for the captured images.

As discussed additionally below, and depending in part on the configuration of the scan target, the UAV may be configured to traverse the virtual contours determined around the scan target using any of various patterns. As one example, the UAV may use a lawn mower pattern to move from the contour at one slice to the contour at the next slice, and may travel in an opposite direction on each alternating slice in a back and forth pattern. As another example, the UAV may perform orbits of the scan target, and may move up/down or left/right to the next adjacent slice (e.g., depending upon which axis the slices are taken) when reaching the end point of the first slice to move to the location of a start point for the next adjacent slice. For example, the UAV may traverse the slices as a plurality of orbits (e.g., circles, ellipses, etc.) around the scan target by making a first orbit at a first slice location, moving to the next slice location making another orbit of the scan target along a contour determined for that slice, and so forth. As yet another example, the UAV may traverse the slices as a series of adjacent vertical columns, e.g., traveling along a length of the scan target vertically at a first vertical slice of the scan target, moving to an adjacent slice, and traveling along that slice as another vertical column, and so forth.

Further, in some examples, depending on the configuration of the scan target, additional slices may also be determined along a second axis (e.g., perpendicular to the first axis) for capturing additional images of the scan target. For example, suppose that a first series of slices of the scan target are captured by slicing the scan target across the z axis for capturing images of the sides of the scan target. The scan target may be further sliced across the x or y axis, such as for capturing images of a top and/or bottom of the scan target. Additionally, if necessary, additional slices may be taken across a third axis or some combination of axes. Further, while the examples discussed herein describe a number of optimal slicing techniques and patterns, numerous variations in slicing particular scan targets and selecting possible patterns for traversing the contours determined for the slices will be apparent to those of skill in the art having the benefit of the disclosure herein.

In some implementations herein, the UAV may determine a structured continuous path that may be traversed, such as at constant speed and while capturing images at regular intervals to obtain regularly spaced images. The speed may be determined in some cases based on a threshold acceptable amount of motion blur for the captured images, which in turn, may be dependent in part on the intended use of the captured images and the required level of detail. For example, the farther from the surface of the scan target the images are captured, the faster the speed of the UAV can be while capturing sequential images of the surface when traveling along a contour travel path. On the other hand, in cases in which close up detailed images of the surface are desired, the UAV may slow down or even stop to capture the images so that there is zero motion blur.

In some implementations herein, [independent claims]

For discussion purposes, some example implementations are described for configuring a UAV to autonomously scan a scan target for capturing images of the scan target. However, implementations herein are not limited to the particular examples provided, and may be extended to other types of scan targets, other types of vehicles, other types of flight path planning techniques, other types of scanning, other types of image capture, and so forth, as will be apparent to those of skill in the art in light of the disclosure herein.

FIG. 1 illustrates an example system 100 including an unmanned aerial vehicle (UAV) 102 able to capture images according to some implementations. In this example, the UAV 102 is able to communicate with a controller 104. The controller 104 may include a computing device in some cases. As one example, the controller 104 may include a mobile device, such as a mobile phone, tablet computing device, wearable device, laptop computer, or the like, that is able to communicate wirelessly with the UAV 102, such as directly or, alternatively, indirectly through another device, network or the like.

One or more processors (not shown in FIG. 1) onboard the UAV 102 may be configured by executable instructions to receive images from at least one camera mounted on the UAV 102. In the illustrated example, the UAV 102 includes a plurality of cameras, such as first camera 106 and a plurality of second cameras 108. For instance, the first camera 106 may include a lens having a longer focal length, and may include a higher-resolution image sensor, than the second cameras 108. The second cameras 108 may have a shorter focal length, a wider field of view (FOV), and lower-resolution image sensors than the first camera 106. The first camera 106 may be mounted on a gimbal 110 to enable the first camera 106 to be aimed at a desired target object or other scan target, such as scan target 111 in this example. In some cases, the second cameras 108 may provide images that the UAV 102 may use for various purposes such as navigation, position determination, distance determination, stereo imaging, obstacle avoidance, tracking, and the like.

The UAV 102 is able to communicate with the controller 104, such as via wireless communications. The controller 104 may be controlled by a user 112, and may be configured for two-way communication with the UAV 102 through any of a variety of types of wireless communication technologies. As several examples, the controller 104 may communicate via various types of radio protocols and frequencies, such as via a Wi-Fi network, a BLUETOOTH® radio link, cellular radio, direct ISM band communications, or any other suitable radio communications. For example, 900

MHz, 2.4 GHz, and 5.8 GHz are the most common radio frequencies used for two-way communications with UAVs, but implementations herein are not limited to any particular communication types, frequencies, or protocols.

Additionally, or alternatively, the UAV 102 may communicate with one or more networks 113, such as through any of the types of wireless communications discussed above, or any other type of wireless communication technology. As one example, the network(s) 113 may include wireless access points, cellular radio towers or other cellular transceivers, short-range radio transceivers, or the like, to enable the UAV 102 to connect with and communicate over the one or more networks 113.

The UAV 102 includes a body 114 and one or more propulsion devices 116. In this example, a first set of the second cameras 108 are mounted on an upper side of the body 114 and a second set are mounted on an underside of the body 114. Additionally, the first camera 106 may include a fixed-focal-length lens or, alternatively, may include an optically zoomable lens. The gimbal 110 enables the first camera 106 to be aimed at and focused on a target without having to rotate the UAV 102 to be pointed directly at the desired target. The UAV 102 may capture images through the first camera 106 and may transmit at least some of the captured images to the controller 104 as images 118. Additionally, in some implementations, at least some of the images captured by the second cameras 108 may also be transmitted as part of images 118. In some examples, the transmitted images 118 may be lower resolution images as compared to the resolution of the images captured by the UAV 102 to enable faster wireless transmission to the controller 104, or the like.

In some cases, the UAV 102 may use images captured by the UAV 102 to generate 3D model information onboard the UAV 102, and at least a portion of the 3D model information may be sent as model information 120 to the controller 104. The controller 104 may receive the images 118 (which may include video or still images) from the UAV 102 via the wireless communication link. Based on the received images 118, the user 112 may use a display 124 associated with the controller 104 to view a field of view captured by the UAV 102 and/or to view a 3D model of the scan target 111 that may be generated at least partially by the UAV 102 and provided as the 3D model information 120.

In some examples, the user 112 may use the controller 104 to select the scan target 111 for instructing the UAV 102 to perform a scan of the scan target 111. Further, the user 112 may use the controller 104 to issue other conventional commands to the UAV 102, e.g., "takeoff", "land", "follow", such as via one or more virtual controls presented in a graphical user interface (GUI) and/or via one or more physical controls, such as joysticks, buttons, or the like, included on the controller 104 (not shown in FIG. 1). Accordingly, the controller 104 may allow the user 112 to make manual control inputs for manually controlling the UAV 102 and/or for instructing the UAV 102 to operate autonomously. An example controller 104 is illustrated and discussed additionally below with respect to FIGS. 10 and 11.

In some examples, the controller 104 and/or the UAV 102 may be able to communicate over one or more networks 113 with one or more service computing devices 126 or other suitable computing devices, such as other user computing devices. The one or more networks 113 can include any appropriate network or other communication technology, including a wide area network (WAN), such as the Internet; a local area network (LAN), such an intranet; a wireless network, such as a cellular network or other radio communications; a local wireless network, such as Wi-Fi; close-range wireless communications, such as BLUETOOTH®; a wired network, including fiber optics and Ethernet; any combination of the foregoing, or any other suitable communication network or other communication technology.

In some cases, the service computing device(s) 126 may be located remotely from the controller 104 and/or the UAV 102, such as at a cloud computing location, data center, server farm, or the like. The service computing device(s) 126 may include a management program 128 that may be executed to communicate with the controller 104 and/or the UAV 102, such as for receiving images 132 for storage in a database 130. The images 132 may include the images 118 discussed above and/or may include a full set of images of the scan target 111 captured by the UAV 102 during the scan of the scan target 111. For instance, the full set of images at a specified resolution may be uploaded to the service computing device 126 over time, such as after the UAV 102 has completed the scan of the scan target 111. Further, the database 130 may include 3D model information 134. For instance, the 3D model information may include the 3D model information 120 sent by the UAV 102. Additionally, or alternatively, the management program 128 may execute one or more 3D modeling programs using the received images 132 and associated position information received from the UAV 102 for generating a high resolution 3D model of the scan target 111 that may be textured using the captured images.

In addition, the management program 128 may perform other functions for managing the images 132 and other information received from the controller 104 and/or from the UAV 102. In some cases, the service computing device 126 may include a web application (not shown in FIG. 1) that may enable the user 112 associated with the controller 104 to access the images 132 in the database 130, the 3D model information 134, and/or other information related to the UAV 102, or the like.

In some examples, the one or more processors onboard the UAV 102 may be configured by program code or other executable instructions to perform the autonomous operations described herein. For instance, the one or more processors may control and navigate the UAV 102 along an intended flight path, while also performing other operations described herein, such as generating or accessing an initial lower-resolution model of the scan target 111, determining a plurality of slices of the scan target 111 based on the initial model, determining contours for each slice, and determining waypoints for capturing images of the surface of the scan target 111. The UAV 102 may determine a scan plan for navigating the UAV 102 along the plurality of contour paths, such as at a constant speed for capturing regularly spaced images at regular intervals, while also avoiding obstacles.

The initial model of the scan target 111 may be updated in real time during the scanning based on additional image information acquired by the UAV 102 during the scanning. Additionally, or alternatively, in some cases, the controller 104 or the service computing device(s) 126, which are remote from the UAV 102 and in communication with the UAV 102 may provide instructions to the processors onboard the UAV 102, such as for assisting with or managing one or more of the operations discussed above. For instance, the initial model may be received by the UAV 102 from the controller 104 or the service computing device(s) 126, rather than having the UAV create the initial model of the scan target using distance determination.

To begin a scan, the user 112 may initially indicate the scan target 111, or a portion of the scan target 111, such as by making one or more inputs to a user interface presented on the controller 104 or other computing device able to provide the input information to the UAV 102. As one example, the user 112 may navigate the UAV 102 manually to obtain an image of the scan target, and the user 112 may create a polygon or other 2D shape on the image of the scan target presented in the user interface to indicate the scan target. Alternatively, the user may specify a bounding volume around an image of the scan target in the user interface, may specify a bounding area, such as based on three or more reference points (e.g., "pillars"), or may use any of a plurality of other techniques, to specify the scan target to the UAV 102. For instance, the user may employ a technique for specifying the scan target that is determined to be most effective, such as depending on the shape of the scan target, the type of scan desired, the portions of the target desired to be scanned, and the like.

Based on the received indication of the scan target 111, the UAV 102 may correlate the indication of the scan target 111 with one or more positions in space, such as based on correlation with a global coordinate system, a navigation coordinate system, or through various other techniques. For instance, the UAV 102 may autonomously perform an initial coarse scan of the scan target 111, e.g., by performing the initial scan with a range sensor or the like to determine a location of the scan target surface in 3D space. As one example, the range sensor may be provided by one or more of the second cameras 108, each having an image sensor. For instance, an array of two or more of the second cameras 108 may be configured for stereoscopic imaging and may be used to determine distances from the UAV 102 to various points on the surface of the scan target 111. The second cameras 108 may also be used by the UAV 102 for enabling autonomous navigation and may provide one or more lower-resolution images (e.g., as compared to images received from a higher-resolution image sensor of the first camera 106) that are able to be used to determine a distance from the UAV 102 to surfaces of the scan target 111. In the case that the second cameras 108 include one or more stereo imaging pairs, the UAV 102 may use input from the second cameras 108 to determine a parallax between two related images of the same surface for determining a relative distance from the UAV 102 to one or more points on the surface of the scan target 111. Alternatively, images from one or more mono-vision second cameras 108 taken from different angles may be used, and/or various other distance sensing and 3D reconstruction techniques may be used, for determining the locations of surfaces of the scan target in 3D space, such as relative to a known location of the UAV 102.

As one example, the UAV 102 may fuse range images from stereo pairs of the second cameras 108 and/or wide baseline MultiView Stereo (MVS) pairs of the second cameras 108 into a volumetric Signed Distance Function (SDF), which can provide a surface location estimate including a plurality of points. For example, an occupancy map may be determined initially and then a full SDF model including the locations of a plurality of points in 3D space may be determined subsequently for the scan target 111. The plurality of points may indicate the location of the various points on the surface(s) 136 of the scan target 111.

As another alternative, the UAV 102 may sample the surfaces 136 of the scan target 111 for contours at the surface 136 and may expand these zero contours based on a function of the normal of each zero contour, which may also include a smoothing step to determine a contour path at a selected distance from the zero contour (i.e., the surface of the scan target 111). A spline fit may be one technique for this alternative technique. Additionally, performing initial sampling at a greater distance from the surface 136 of the scan target 111 may be more efficient for quickly generating an overall lower resolution 3D model of the scan target 111, but may result in limited details of smaller surface contours of the scan target 111, which may result in poorer image capture during the detailed scanning of the scan target 111, such as in the case that oblique surfaces are present.

As mentioned above, the initial SDF model may typically be a low resolution 3D model comprising a plurality of points in 3D space indicating the location of some points on the surface 136 of the scan target 111, which may typically include the locations of the major edges 138 of the scan target 111 in 3D space. The SDF model may be referred to as a lower resolution 3D model having lower accuracy because the scan target 111 has not yet been imaged or otherwise scanned from sufficiently diverse points of view and/or sufficiently close distance for higher accuracy. For example, the closer the UAV 102 flies to a surface, the more accurate the estimate of the surface location and surface shape becomes in the SDF model as the UAV 102 continues to fuse stereo pair range images into the model.

The initial scan may be performed by the UAV 102 to generate a low resolution 3D model of the scan target. During the initial scan, the UAV 102 may autonomously image one or more surfaces of the scan target 111. The UAV 102 may dynamically improve the completeness and/or resolution of the lower-resolution 3D model in real time while flying proximate to the scan target 111 and capturing additional images, either during the initial scan, or subsequently when performing the full scan of the scan target 111. For instance, the lower-resolution 3D model may include a set of a plurality of points in 3D space, with the locations of the points corresponding to surfaces of the scan target 111 determined based on the distance measurements.

The UAV 102 may use the lower-resolution 3D model to generate a scan plan for performing the scanning (i.e., high-resolution image capture) of the scan target 111. For instance, scanning may include capturing a series of images of the surfaces 136 of the scan target 111 from a selected distance (e.g., a selected ground sampling distance) between the UAV 102 and the scan target 111 for capturing images of a desired resolution, detail, overlap, and the like. For example, determining the scan plan may include slicing the scan target 111 into a plurality of slices 140, such as along a selected axis, a scan-target centerline, a scan target body, or the like, as discussed additionally below. In the illustrated example, suppose that the UAV 102 has divided the scan target 111 into a plurality of slices 140(1)-140(14) taken along a Z-axis of a coordinate system 142 determined for the scan target 111, as discussed additionally below.

Further, the UAV 102 may select a distance D from the surface 136 of the scan target 111 to use as the baseline distance. In some cases, the distance D may be a predetermined default value specified for a particular type of scan to be performed, such as based on a desired level of detail for the captured images, an intended use of the scan results, or the like. Additionally, or alternatively, the distance D may be specified by the user 112.

In addition, the UAV 102 may determine an overlap percentage O and a sidelap percentage S for the images that will be captured during the scanning. For example, the overlap O may be a percentage of overlap of consecutive images taken in the direction of travel of the UAV while capturing images during the scanning. The sidelap (aka, lateral or side overlap) may refer to the amount of overlap between images of adjacent contour slices 140, i.e., how much side overlap to provide between images taken along a second slice 140(2) with images taken along a first slice 140(1) adjacent to the second slice 140(2). In some cases, overlap and sidelap may be default values determined in advance for performing a particular type of scan and/or may be specified by the user 112, etc.

Based on the camera FOV of the camera that will be used to capture images during the scan (e.g., the FOV of the first camera 106 in the example of FIG. 1), the UAV 102 may determine a waypoint baseline Bw from the distance D and the overlap O. For example, the waypoint baseline Bw may be the distance along the slice contour that the UAV 102 travels between where one image is captured and the next image is captured (e.g., considering the FOV, the distance D from the camera to the surface, and the percentage of the overlap O). For instance, the surface area covered by each image may be calculated based on the FOV and the distance D. Further, any rotation of the UAV 102, (e.g., around the Z axis in the example of FIG. 1) may be tracked and controlled when moving from the waypoint where the image is captured to the next waypoint where the next image is captured, to ensure that the specified overlap of the two images is achieved. For example, the gimbal 110 may be controlled to aim the camera 106 at the next look at point to counteract rotation of the UAV 102 while traversing the contour path.

The UAV 102 may also determine a slice baseline Bs from the distance D and the sidelap S. For example, the slice baseline distance Bs may be the distance between a slice and an adjacent slice. For example, the area of the surface covered by the FOV can be determined based on the distance D from the camera 106 to the surface 136, and then, based on the specified percentage of the sidelap S, the UAV 102 may determine how far apart to space the slices 140 (i.e., slice baseline distance Bs).

After the slice baseline Bs is determined, the UAV 102 may determine how many slices 140 to apply to the scan target 111, since the slice baseline Bs specifies the allowable distance between adjacent slices. As one example, the UAV may associate an (X, Y, Z) coordinate system 142 with the scan target 111. Various techniques may be used for determining how to associate the coordinate system 142 with the scan target 111. As one example, the orientation of the coordinate system 142 may be based in part on the detected shape of the scan target 111 as determined from the SDF model. For instance, in the example of FIG. 1, the scan target 111 is an elongated structure extending vertically upward, and so the UAV 102 may associate one of the axes, such as the Z-axis in this case, with the longest vertical part of the scan target 111 (e.g., the major edges 138), and may attempt to associate at least one of the other axes, i.e., the X axis and/or Y axis, with other detected major edges 144 and/or other prominent structures of the scan target 111. As another alternative, the UAV 102 may fit a bounding ellipse to the scan target, and may associate one axis of the coordinate system, such as the Z axis in this example, to the major axis of the ellipse, and one of the X axis or the Y axis to the minor axis of the ellipse. As yet another alternative, the UAV 102 may fit a bounding rectangle to the scan target, and assign one axis of the coordinate system 142 to the major axis of the bounding rectangle and another axis of the coordinate system 142 to the minor axis of the bounding rectangle. AS still another alternative, the user may determine how to associate the coordinate system 142 with the scan target. As still another alternative, the UAV 102 may employ a machine learning model for determining an optimal assignment of the X, Y, Z axes to the scan target. For example, the machine learning model may be trained on a plurality of different structures that have coordinate systems associated with them for training the machine learning model to assign coordinate system axes to various shapes and structures.

After the coordinate system 142 has been associated with the scan target 111, then for each axis A in the (X, Y, Z) coordinate system 142, the computing device may sample SDF slices along the selected axis A in a sequential order (e.g., ascending or descending order) in steps of Bs, e.g., such that A=floor+n*Bs. After the scan target model is divided into the plurality slices 140 at a distance Bs apart from each other along the selected axis A, then for each slice, the UAV 102 may determine the contour of D along that slice. The contours may be represented as a set of 1D paths (e.g., from one waypoint to an adjacent waypoint) in the 2D plane corresponding to the particular slice.

The UAV 102 may further determine waypoint positions based on the waypoint baseline Bw for each contour step from one waypoint to the next adjacent waypoint along the contour path in the 2D plane of the respective slice. Each waypoint is an image capture location at which the first camera may be operated to capture an image of the surface of the scan target 111. Further, for each selected waypoint in the slice, the UAV may select a look-at point on the surface of the scan target 111 as a function of the SDF gradient and the slice plane. For example, the look-at point may be a point on the surface of the scan target 111 at which the focal point of the first camera 106 is aimed for capturing an image of the surface when the UAV 102 is positioned at the corresponding selected waypoint. The rotation of the gimbal 110 and the rotation of the UAV 102 may be controlled as the UAV 102 moves from one waypoint to the next waypoint to aim the first camera at the specified look-at point for the current waypoint.

In addition, the UAV 102 may order the waypoints within each slice in an optimal manner. As one example, the UAV 102 may execute a traveling salesman problem algorithm between the mean locations of the waypoints. This provides an ordered set of slices containing an ordered set of contours containing an ordered set of waypoints. The process may be repeated for each of the other two axes to provide an ordered set of slices containing an ordered set of contours with an ordered set of waypoints for each of the three axes X, Y, and Z of the coordinate system 142.

In some examples, the UAV 102 may apply a preferred axis ordering, such as Z, X, Y that prioritizes keeping for image capture all the waypoints in the first selected axis, and then pruning the waypoints from the second and third axes based on some proximity to an incremental coverage metric. For instance, if the selected axis provides complete coverage of all the areas of the scan target that are desired to be scanned, then scanning along the other two axes may not be performed at all. However, if the first selected axis provides only partial coverage, the UAV 102 may select one of the remaining axes that provides coverage of the remaining area left uncovered by the slices of the first selected axis. Following selection of the axes and slices to be traversed, the UAV 102 may select a starting location based on minimizing unnecessary travel distance during scanning, such as by starting at one end of the first selected axis. Depending on the configuration of the scan target and the slices, the UAV 102 may perform an orbital pattern of consecutive orbits of the scan target, may perform a lawn mower pattern, may perform a column pattern, or may perform a combination of these patterns. The UAV 102 may traverse a selected one of the axes contour by contour in order (sequentially), such as starting at the first end of the axis and moving to the other end. For instance, in the illustrated example, the UAV 102 may start with slice 140(1), and move sequentially upward slice by slice, e.g., to 140(2), 140(3), etc., or vice versa, may start at slice 140(14) and move sequentially downward slice by slice, e.g., to 140(13), 140(12), and so forth.

In addition, the UAV 102 may be configured to move at a selected constant speed when traversing the contour paths. For instance, the UAV 102 may determine the traversal speed based on the selected distance D, exposure time settings of the camera, current lighting conditions, and the amount of permissible motion blur for the intended use of the captured images. Motion blur may be determined based on a distance (in pixels) that a point on the surface of the scan target travels on the camera image sensor between the time at which exposure begins and the time at which exposure ends. For instance, depending on the desired sharpness of the images, a threshold level of permissible motion blur may be established. Based on the threshold level of permissible motion blur, the capabilities of the first camera 106 (e.g., as determined based on a camera model previously determined empirically for the first camera 106 or supplied by the camera manufacturer), the current lighting conditions, e.g., as determined by a light sensor associated with the first camera 106, and the distance D, the UAV 102 may determine a maximum traversal speed for traversing the contour paths of the slices, and may traverse the contour paths, e.g., at a constant speed based on the maximum traversal speed while capturing images at the waypoints at regular intervals without having to slow or stop at the respective waypoints.

In some examples, the speed at different sides of the scan target may be different. For instance, if one side of the scan target 111 is in shadow, while the other side is in bright sunlight, the UAV 102 may travel at a slower constant speed on the shadow side and a higher constant speed on the sunlit side. Alternatively, as another example, the UAV 102 may determine a maximum constant speed for the portion of the scan target 111 with the lowest light level, and may use that speed as the constant image capture speed for the entire scan. Numerous other variations will be apparent to those of skill in the art having the benefit of the disclosure herein.

During the scanning of the scan target 111, such as when traversing contour paths (not shown in FIG. 1) corresponding to the slices 140(1)-140(14), the UAV 102 may identify additional contours or other surfaces of the scan target to scan. The UAV 102 may perform re-planning of the scan plan in real time, e.g., as the UAV 102 is performing the scan. For example, the UAV 102 may keep the originally determined slices and may splice a current contour to a new contour when current contour and the new contour are on approximately the same plane (e.g., within less than the size of the slice baseline Bs difference. In other examples, when a previously undiscovered surface is discovered, the UAV 102 may discontinue the current scan and perform an exploration operation to obtain better visualization and effective time estimation, such as by flying around the scan target and a farther distance to generate a mesh 3D model of the scan target including the new area, and determine a new scan plan with additional slices.

In some examples, a coverage metric may be employed to ensure that the UAV 102 performs a scan of all desired areas of the scan target 111. As one example, a first coverage mesh may be created from the waypoints of the plurality of contour paths of the plurality of slices. The UAV 102 may determine any deficient areas and may fill in these areas by capturing images based on comparison of first coverage mesh with a 3D model determined and updated during the scan based on integrating additional point locations into the 3D model by capturing images with the second cameras 108 during the scan. For each deficient area identified based on the comparison, the UAV 102 may determine a normal to the surface at that location and may move to the location to capture one or more images of the surface at the distance D from the surface.

In some examples, the look-at points may be determined based on a gradient of the SDF model. In the case that a Z slice is located close to the ground the gradient of the SDF only in the slice plane may be used, which keeps the gimbal 110 level for that slice, which may avoid a situation in which the gradient would otherwise cause the camera to be aimed toward the ground. In addition, in the case of slices that may be traversed using a lawnmower pattern, the gimbal 110 may be controlled so that the camera 106 is tilted along the contour to capture oblique surfaces that are small relative to the distance as the UAV 102 traverses the rows of the lawnmower pattern back and forth, traveling in the opposite direction on each sequential slice. A similar effect may be achieved for an orbital pattern by reversing the direction of orbit on alternating slices with a forward skewed look-at point.

Based on the scan plan determined for traversing the slices, the UAV 102 may traverse the contour for each slice in a methodical manner, as mentioned above, and in some cases at a constant speed capturing images at a constant rate. Further, in some examples, as the UAV 102 is capturing the images with the first camera 106, the UAV 102 may use images from the second cameras 108 to update the 3D model and improve the accuracy of the 3D model. The UAV 102 may navigate autonomously to capture images of the scan target based on the scan plan. For instance, based on the scan plan, the images may be captured without gaps while the UAV 102 flies continuously from one contour to the next while also avoiding collisions with any obstacles that may be present.

During the scanning of the scan target based on the scan plan, the UAV 102 may use 3D reconstruction techniques to generate a higher-resolution version of the 3D model of the scan target in real time, such as based at least in part on newly detected distances to surface points. In the examples herein, "real time" may include "near-real time", and may refer to performing the referred to processing or other operation(s) without undue delay, e.g., as the processing capacity becomes available while the UAV 102 is still in flight following capture of one or more images and/or while the UAV 102 is performing the scan, traveling between waypoints, or the like. The actual amount of time for the real-time processing herein may vary based on the processing capabilities of the onboard processor(s) and other components of the UAV 102. For example, the UAV 102 herein may perform any of a plurality of different processing operations in real time, such as updating a 3D model, updating the scan plan, and so forth.

In some examples, the scanning and 3D reconstruction may be performed iteratively such as by adding more points representative of the surface of the scan target, or other information, to the 3D model during scanning of the scan target 111 according to the initial scan plan, and dynamically updating the initial scan plan based on the information added to the 3D model. Accordingly, the quality of the surface information for the 3D model may continue to be improved as the UAV 102 navigates the scan plan and additional surfaces may be discovered. In some cases, as the 3D model is iteratively improved in accuracy, coverage, etc., the scan plan may be dynamically updated such as to cover new points that were previously not included or to avoid obstructions that were not previously identified, or the like.

A higher-resolution 3D model and the images captured during the scan may be exported from the UAV 102 to the service computing device(s) 126, such as over the network(s) 113, e.g., after the UAV 102 has completed the scan of the scan target or has completed at least a portion of the scan. In some examples, the captured images and/or the 3D model information may be sent wirelessly to the controller 104 and/or to the service computing device(s) 126 as the scan of the scan target 111 is taking place. In some cases, the images may be correlated with the points on the 3D model for enabling creation of a textured 3D model of the scan target, such as for viewing the scan target 111, performing high-resolution inspection of the scan target 111, or any of various other observation, computer graphic, or computer modeling operations that may be performed with such a high-resolution 3D model and high-resolution images.

Figure 2:
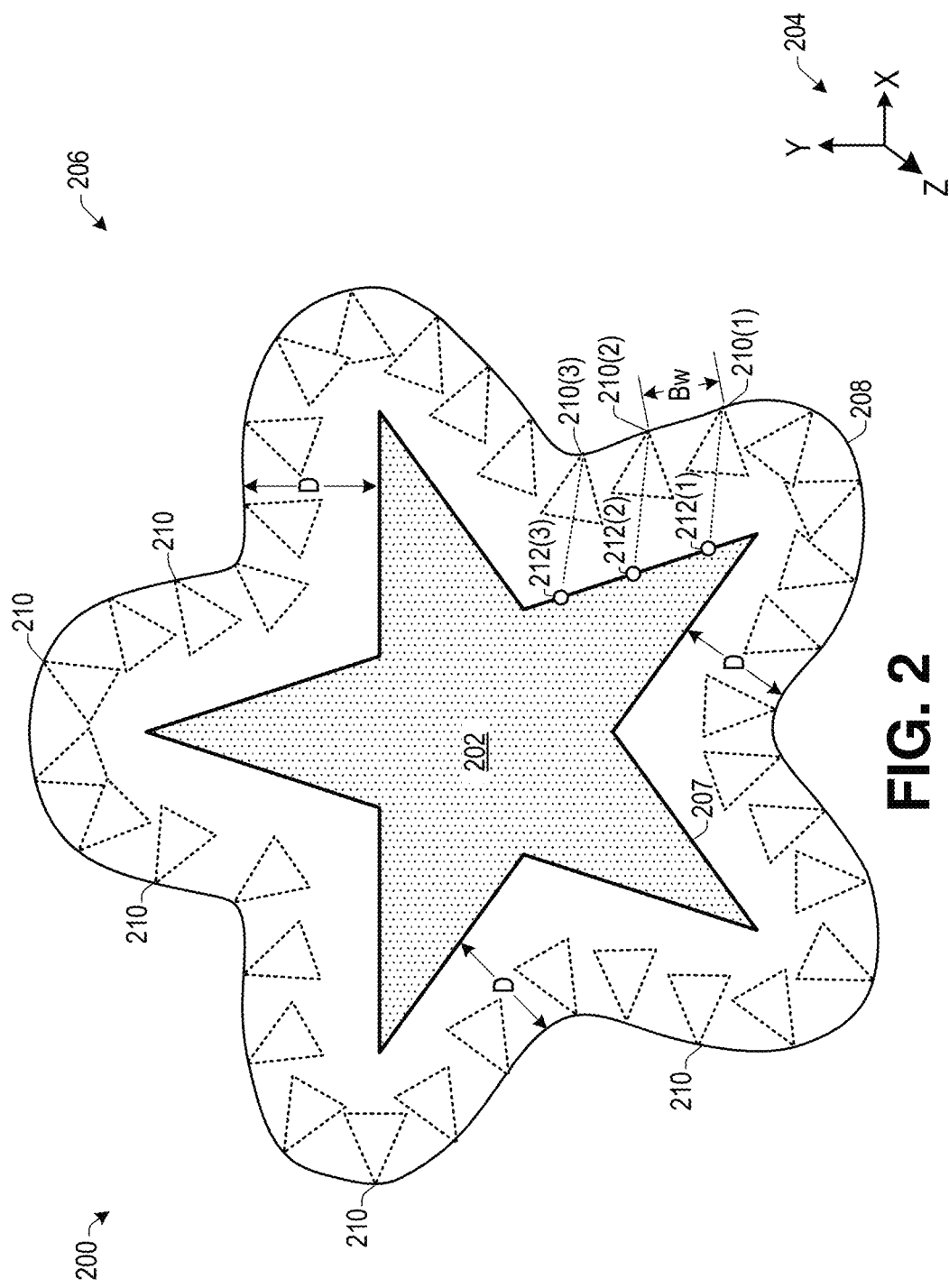
FIG. 2 illustrates an example of determining a contour path and waypoints for a slice of a scan target according to some implementations.

FIG. 2 illustrates an example 200 of determining a contour path and waypoints for a slice of a scan target 202 according to some implementations. In this example, suppose that the scan target 202 has a star-shaped cross section as illustrated. Additionally, as indicated by the coordinate system 204, suppose that the cross-section illustrates an X-Y plane with the Z axis pointing up, and represents a slice 206 taken across the Z axis similar to the slices 140 discussed above with respect to FIG. 1. Of course, in other examples, the slice 206 may be taken across the X axis or the Y axis.

In some cases, each slice may be used to determine an iso-contour sampled along a 2D plane of the SDF model at the location of the slice, such as by holding one axis of the coordinate system constant. For instance, a 2D iso-contour may be determined at the desired distance from the zero contour, i.e., the surface of the scan target. A slice may be taken in any plane, and may be aligned with two of the axes for simplifying computations by holding the third axis constant. For example, holding Z=1 may provide a cross section of Z in the X-Y plane. By taking slices at specified intervals (e.g., based on the slice baseline distance Bs), a plurality of slices may be determined. For each slice, the contour at the distance D from the surface may be sampled to obtain a 1D contour path. Waypoints may then be sampled along the contour path at a spacing related to the specified overlap, i.e., the waypoint baseline distance Bw. The UAV 102 may travel along the contour paths, capturing images at regular intervals, and generally looking inward along the signed distance normal or some derivative of the contour shape. In some cases, the traversal patterns, e.g., lawnmower, orbits, columns, etc., may correspond to specific instances of a scene shape and a chosen slice dimension.

As mentioned above, the UAV 102 may determine the distance D from the surface 207 of the scan target 202 to use as the baseline distance between the first camera 106 and the surface 207 when capturing images for the scan. In some cases, the distance D may be a predetermined default value specified for a particular type of scan to be performed, such as based on a desired level of detail for the captured images, an intended use of the scan results, or the like. Additionally, or alternatively, the distance D may be specified by the user 112 when the user instructs the UAV 102 to perform a scan of the specified scan target 202. Similarly, the user 112 may specify an overlap O and a sidelap S for the scan and/or O and S may be default values for a particular type of scan, particular type of scan target, or the like.

The UAV 102 may determine a contour path 208 for the UAV 102 to traverse relative to the surface 207 based on the distance D. In addition, the UAV 102 may determine the waypoint baseline Bw based on the distance D, the desired overlap O, and the FOV of the first camera 106 that will be used to capture the images for the scan. For example, the waypoint baseline Bw may be the distance along the slice contour path 208 that the UAV 102 travels between where a first image is captured, e.g., at a first waypoint 210(1) and when the next image is captured at a second waypoint 210(2) For instance, the surface area covered by each image capture may be calculated based on the FOV and the distance D. Furthermore, by having the waypoints evenly spaced according to the waypoint baseline Bw, in some examples, the UAV 102 may be configured to traverse the contour path 208 at a constant speed while capturing images of the surface 207 at regular intervals. This arrangement can optimize the operation of the UAV 102 while capturing images, while also ensuring a thorough and methodical coverage of the scan target 202.

Additionally, the location of look-at points 212 may be determined on the surface 207 of the scan target 202. Each look-at point 212 may correspond to one of the waypoints 210, and may be a focus point of the first camera 106 on the surface 207 of the scan target 202 when capturing an image at the corresponding waypoint 210. For example, a first look at point 212(1) may correspond to the first waypoint 210(1), a second look-at point 212(2) may correspond to a second waypoint 210(2), a third look-at point 212(3) may correspond to a third waypoint 210(3), and so forth. In some cases, the waypoint baseline distance Bw may be used to determine the distance between look-at points (not shown in FIG. 2). The locations of the waypoints 210 may then be determined based on the look-at points 212 in some cases.

Further, any rotation of the UAV 102, e.g., around the Z axis may be tracked and controlled, such as when moving from one waypoint 210, where an image is captured, to the next waypoint 210, where the next image is captured, to ensure that the specified overlap of the two images is achieved. For example, the gimbal 110 for the first camera 106 may be controlled to ensure that the camera is aimed at the correct look-at point 222 on the surface 207 when the UAV 102 reaches the waypoint 210 corresponding to that look-at point 222. For instance, the gimbal may be controlled by the UAV 102 to rotate the camera 106 to counteract any rotation of the body of the UAV 102 that may occur while traversing the contour path 208 from one waypoint 210 to the next. Thus, based on the waypoint baseline distance Bw, the UAV 102 may determine a plurality of spaced waypoints 210 along the contour path 208. As mentioned above, this process may be repeated for each slice of a scan target. Following determination of the waypoints, a scanning pattern may be determined for efficiently traversing the waypoints.

Figure 3A:
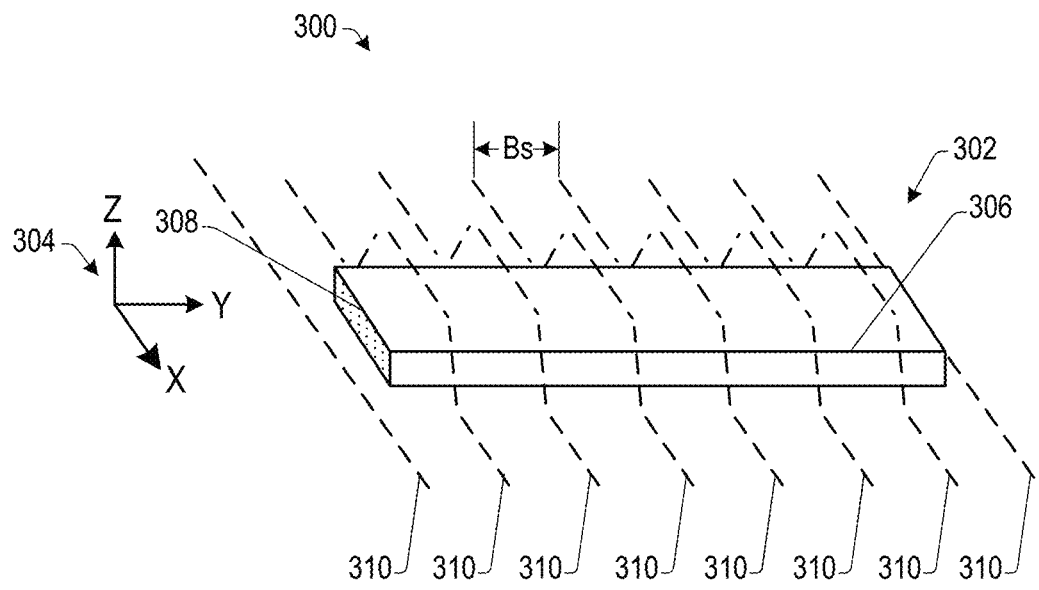
FIGS. 3A and 3B illustrate examples of determining contour paths for a scan target according to some implementations.
Figure 3B:
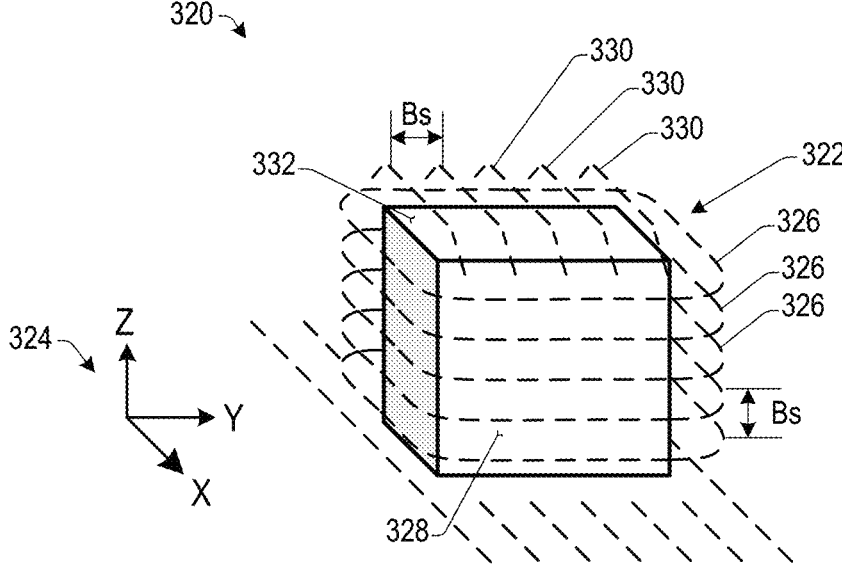

FIGS. 3A and 3B illustrate examples of determining contour paths for a scan target according to some implementations. FIG. 3A illustrates an example 300 of determining slices for a scan target 302 according to some implementations. In this example, the suppose that the UAV 102 has associated a coordinate system 304 with the scan target 302, and has aligned the Y axis of the coordinate system 304 with the longest major edge 306 of the scan target 302 and has aligned the X axis with another edge 308. Further, the UAV 102 has sliced the scan target 302 across the Y axis, resulting in a plurality of slices spaced apart by the slice baseline distance Bs and determined a plurality of corresponding contour paths 310 spaced a distance D from the surfaces of the scan target 302. Furthermore, suppose that the UAV 102 has determined that the contour paths 310 will provide coverage of all the surfaces to be scanned. Accordingly, the UAV 102 may determine waypoint locations for each of the contours 310, and may select a pattern for executing the scan, such as a lawnmower pattern. For example, the lawnmower pattern may be executed by starting on the leftmost or rightmost contour path 310 and flying back and forth along successively adjacent contour paths 310 until the opposite end is reached to scan the scan target 302.

FIG. 3B illustrates an example 320 of determining slices for a scan target 322 according to some implementations. In this example, the scan target 322 is cube shaped, and the UAV 102 has aligned a coordinate system 322 with the horizontal and vertical edges of the cube. Furthermore, the UAV 102 has determined a first plurality of slices along the Z axis for determining a corresponding plurality of first contour paths 326 corresponding to the slices of the Z-axis and spaced at a distance D from the side surfaces 328 of the scan target 322, and spaced apart from each other by the scan baseline distance Bs.

In addition, the UAV 102 has determined a second plurality of slices taken across the Y axis for determining a second plurality of contour paths 330 spaced a distance D from the top surface 332 of the scan target 322 and spaced apart from each other by the scan baseline distance Bs. The UAV 102 may determine a plurality of waypoints for each contour 326, 330. Furthermore, where waypoints may overlap in coverage of the surfaces of the scan target 322, the UAV 102 may remove some of those waypoints to avoid duplication of image capture on the same surfaces of the scan target 322. For instance, in this example, the Y-axis waypoints for capturing images of the sides 328 of the scan target 322 may be eliminated from a scan plan executed for scanning the scan target 322. Additionally, when determining a scan plan for scanning the scan target 322, the UAV may execute an orbit pattern for traversing the first plurality of contour paths 326, such as by starting at the bottom or the top of the scan target 322 for scanning the side surfaces 328, and then may subsequently apply a lawnmower pattern for traversing the second plurality of contour paths 330 for scanning the top surface 332 of the scan target 322. Furthermore, while several examples of determining contour paths for various different types of scan targets are described herein, numerous variations will be apparent to those of skill in the art having the benefit of the disclosure herein.

Figure 4A:
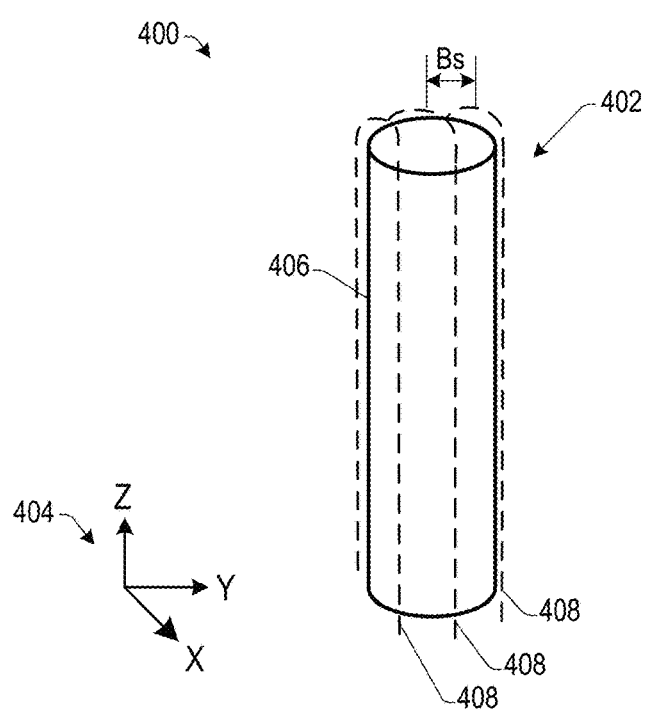
FIGS. 4A and 4B illustrate examples of determining contour paths for a scan target according to some implementations.
Figure 4B:
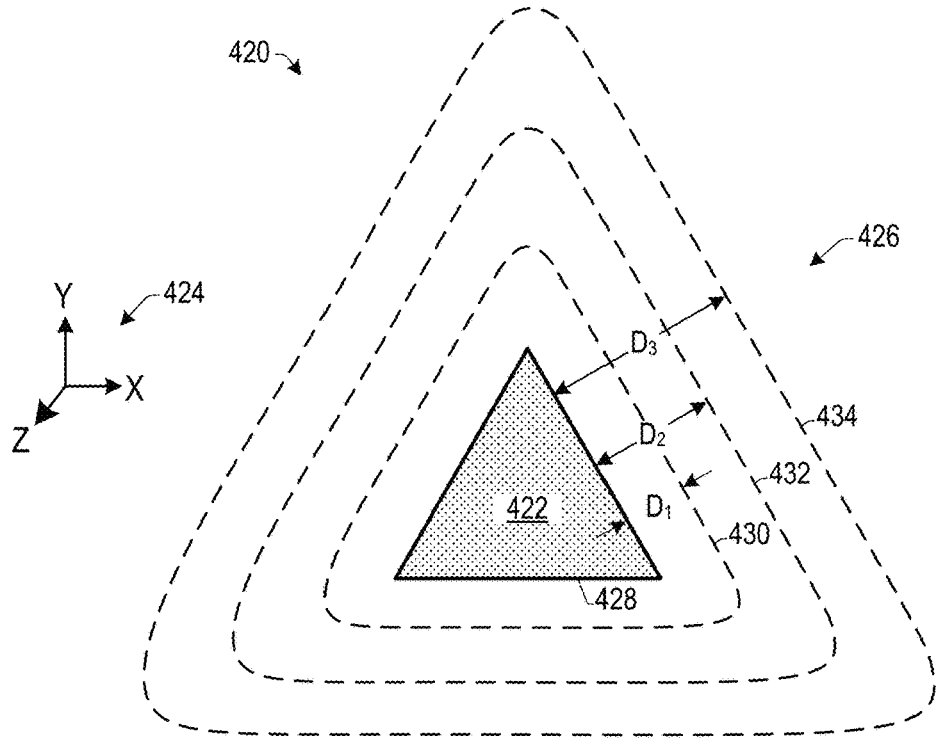

FIGS. 4A and 4B illustrate examples of determining contour paths for a scan target according to some implementations. FIG. 4A illustrates an example 400 of determining vertical column contour paths for a scan target 402 according to some implementations. In this example, suppose that the UAV 102 has associated a coordinate system 404 with the scan target 402, and has aligned the Z axis of the coordinate system 404 with the longest major edge 406 of the scan target 402. Further, the UAV 102 has sliced the scan target 402 across the Y axis to determine a plurality of slices in the X-Z plane to obtain a plurality of respective vertical column contour paths 408. The contour paths 408 are spaced apart from each other by no more than the slice baseline distance Bs. After the UAV 102 has determined waypoint locations along the contour paths 408, the UAV 102 may start at the bottom of the first contour path 408 and traverse the vertical column contour path 408 by traveling up and then back down the other side of the contour path 408, moving to the next adjacent contour path 408 and repeating until all the contour paths 408 have been traversed.

FIG. 4B illustrates an example 420 of determining a plurality of contour paths for a slice of a scan target 422 according to some implementations. In this example, suppose that the scan target 422 has a triangular cross section as illustrated. Additionally, as indicated by the coordinate system 424, suppose that the cross-section illustrates an X-Y plane with the Z axis pointing up, and represents a slice 426 taken across the Z axis. In this example, suppose that the UAV 102 has been instructed to perform three scans of the scan target at three different distances $D_1$, $D_2$, and $D_3$, respectively, from the surface 428 of the scan target 422. Accordingly, the UAV 102 may determine three iso-contour paths corresponding to the three different distances, namely a first contour path 430 located at the distance $D_1$ from the surface 428, a second contour path 432 located at the distance $D_2$ from the surface 428, and a third contour path 434 located at the distance $D_3$ from the surface 428. As one example, the UAV 102 may traverse all the contour paths for the distance $D_3$, then all the contour paths for distance $D_2$, and then all the contour paths for distance $D_1$. As another example, the UAV 102 may traverse the three contour paths at $D_3$, $D_2$, and $D_1$ for each slice 426 before moving up or down the Z axis to the next adjacent slice. In some examples, the speed at which the UAV 102 traverses the respective contour paths 430, 432, and 434 may be different. For example, the traversal speed of the contour path 434 may be faster than that for contour path 432, and the traversal speed of the contour path 432 may be faster than that for contour path 430, such as to reduce the amount of motion blur that may occur for images taken on the contour path 430 that is closer to the surface 428 and enable capturing of images of higher detail.

FIGS. 5 and 6 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 5 is a flow diagram illustrating an example process 500 for scanning a scan target according to some implementations. In some examples, at least a portion of the process 500 may be executed by the UAV 102, such as by executing a scanning program and vehicle control program. Alternatively, in some examples, at least a portion of process 500 may be performed by a computing device that is remote from the UAV 102, such as the controller 104 and/or the service computing device(s) 126.

At 502, the UAV 102 may receive an indication of a scan target. In some examples, the UAV 102 may receive the indication of the scan target from the controller 104, such as based on one or more user inputs made via the controller 104. Alternatively, as another example, the UAV 102 may receive the indication of the scan target from the service computing device(s) 126, or from any other computing device able to communicate with the UAV 102.

At 504, the UAV 102 may determine the distance D, the overlap O, and the sidelap S to use for the requested scan. In some cases, the distance D, the overlap O and/or the sidelap S may be predetermined default values specified for a particular type of scan to be performed, such as based on a desired level of detail for the captured images, an intended use of the scan results, or the like. Additionally, or alternatively, one or more of these values may be specified by the user 112.

At 506, the UAV 102 may access a model including a plurality of points in 3D space representing locations of one or more surfaces of the indicated scan target. As one example, the UAV 102 may generate a 3D SDF model as discussed additionally below with respect to FIG. 6 based on capturing a plurality of initial images of the scan target in response to the received indication of the scan target. In other examples, the UAV 102 may receive a pre-existing 3D model of the scan target from the controller 104, the service computing device(s) 126, or other remote computing device.

At 508, the UAV 102 may determine a waypoint baseline distance Bw and a slice baseline distance Bs for the scan. For example, the UAV 102 may determine the waypoint baseline distance Bw based on the FOV of the first camera 106, the distance D, and the overlap O. The waypoint baseline Bw may be the distance along the slice contour that the UAV 102 travels between where one image is captured and the next image is captured while maintaining the desired overlap. Similarly, the UAV may determine the slice baseline distance Bs based on the FOV of the first camera 106, the distance D, and the sidelap S. For example, the slice baseline distance Bs may be the distance between a slice and an adjacent slice.

At 510, the UAV 102 may associate a coordinate system with the scan target. As one example, the UAV 102 may associate one of the axes of the coordinate system with a longest edge or element of the scan target, and may attempt to associate the other axes with other parts of the scan target, such as other major edges or the like.

At 512, for each axis A in the (X, Y, Z) coordinate system, the UAV 102 may determine one or more slices across the axis A and spaced apart on the axis A by the slice baseline distance Bs. For example, in the case that the operation is being performed on a 3D SDF model, the slices may be determined for the SDF model along each of the three axes of the coordinate system.

At 514, the UAV 102 may, for each slice, determine the contours of the distance D. As one example, the contours may be determined as a set of a plurality of 1D paths in the 2D plane of the respective slice. The plurality of 1D paths together may comprise a contour path in 3D space located at the distance D from the surface of the scan target.

At 516, for each contour, the UAV 102 may step along the contour to determine waypoint positions spaced apart by no more than the waypoint baseline distance Bw.

At 518, for each waypoint, the UAV 102 may determine a look-at point for the camera to focus on when the UAV 102 is at that respective waypoint. As one example, the look-at points may be determined as a function of the SDF gradient of the slice plane for the respective waypoint.

At 520, the UAV 102 may order the contours within each slice. For example, the UAV 102 may use a traveling salesman problem (TSP) algorithm for ordering the contours based on their respective mean locations. Repeating blocks 512-520 for each axis of the coordinate system may result in an ordered set of slices containing an ordered set of contours containing an ordered set of waypoints for each axis of the coordinate system.

At 522, the UAV 102 may determine a scan plan for performing the scan. As one example, the UAV 102 may use a preferred axis ordering, such as selecting the Z axis, then the X axis, and then the Y axis. Alternatively, as another example, the UAV 102 may select the axis with the largest number of slices. The UAV 102 may then prune slices and/or waypoints from the other two axes, such as based on a proximity metric, an incremental coverage metric, or the like. For example, in the case that an area of the surface of the scan target is already covered by the waypoints of the selected axis, then the waypoints for the other two axes for that area may be pruned or otherwise not used.

At 524, the UAV 102 may determine an efficient pattern for executing the scan plan. For example, the UAV 102 may initially attempt to apply an orbital pattern for traversing the contour paths when the contour paths encompass the scan target. Alternatively, for those contour paths for which an orbital pattern cannot be applied, the UAV 102 may attempt to apply a lawnmower pattern or other efficient pattern that enables movement from one contour path to an adjacent contour path of an adjacent slice following traversal of the first contour path.

At 526, the UAV 102 may determine a speed at which to traverse the respective contour paths in the scan plan. As one example, the UAV 102 may be configured to traverse at least a portion of the contour paths at a constant speed for capturing images of the scan target surface at regular intervals of time and/or space. For example, the UAV 102 may determine the traversal speed based on the selected distance D, exposure time settings of the camera, current lighting conditions at the scan target surface, and the amount of permissible motion blur for the intended use of the captured images. In some cases, depending on the desired sharpness of the images, a threshold level of permissible motion blur may be established. Based on the threshold level of permissible motion blur, the capabilities of the first camera 106, the current lighting conditions, e.g., as determined by a light sensor associated with the first camera 106, and the distance D, the UAV 102 may determine a constant traversal speed for traversing the contour paths of at least a portion of the scan plan.

In some examples, the speed at different parts of the scan plan may be different. For instance, if one part of the scan target is shaded, while another part is well lit, the UAV 102 may travel at a slower constant speed over the shaded part, and at a higher constant speed with respect to the well-lit part. Alternatively, as another example, the UAV 102 may determine a maximum constant speed for the portion of the scan target having the lowest light level, and may use that speed as the constant image capture speed for the entire scan plan. Numerous other variations will be apparent to those of skill in the art having the benefit of the disclosure herein.

At 528, the UAV 102 may execute the scan plan by traveling at the determined constant speed(s) where possible and capturing images at the regular intervals of time and/or space, as enabled at least in part by the continuous structured nature of the contour paths.

FIG. 6 is a flow diagram illustrating an example process 600 for generating a 3D model of a scan target according to some implementations. In some examples, at least a portion of the process 600 may be executed by the UAV 102, such as by executing a scanning program and a vehicle control program as discussed additionally below. Alternatively, in some examples, at least a portion of the process 600 may be performed by a computing device that is remote from the UAV 102, such as the controller 104 and/or the service computing device(s) 126.

At 602, the UAV 102 may receive an indication of a scan target. For example, the UAV 102 may receive the indication of the scan target from the controller 104, such as based on one or more user inputs made via the controller 104. Alternatively, as another example, the UAV 102 may receive the indication of the scan target from the service computing device(s) 126, or from any other computing device able to communicate with the UAV 102.

At 604, the UAV 102 may determine one or more poses for capturing images of surfaces corresponding to the indicated scan target. For example, in the case that a bounding area or volume is used to specify the scan target, the UAV 102 may determine one or more locations and fields of view at which to capture images of the indicated scan target based on correlating the bounding area or bounding volume to real-world locations for capturing images of any surfaces within the bounding area or bounding volume.

At 606, the UAV 102 may control the propulsion mechanism 116 of the UAV 102 to fly to the determined one or more poses for capturing images at each pose. As one example, the UAV may capture images concurrently with two or more of the second cameras 108 so that the second cameras 108 serve as a stereoscopic rangefinder to enable determining distances to various points on the surfaces of the scan target.

At 608, the UAV 102 may determine distances from the UAV to the surfaces captured in the images, such as based on determining a parallax between points in the related images. For example, the UAV 102 may employ multi-view stereo analysis of the multiple images for determining the respective distances of the respective points on the surfaces of the scan target.

At 610, the UAV 102 may use the images from the cameras 108 for generating a 3D SDF model including locations of a plurality of points in 3D space. The 3D model may initially be a rough lower resolution 3D model that may be improved in accuracy as additional images of the scan target are captured by the UAV 102. For example, the lower-resolution 3D SDF model may include a plurality of points whose locations in a 3D space may be determined based on image analysis, such as determining a parallax or other differences between two or more images of the points captured using multiple image sensors on the UAV 102.

At 612, the UAV 102 may send information for the lower-resolution 3D model to a remote computing device. For example, the model information for the 3D SDF model may be sent to the controller 104, the service computing device(s) 126, or other computing device remote from the UAV 102 that may be in communication with the UAV 102. Furthermore, as discussed above, the 3D SDF model may be used for determining a scan plan for scanning the scan target such as discussed above with respect to FIG. 5. In addition, while a signed distance function has been described as one technique for determining the locations in 3D space of the points on the surface of the scan target, other techniques will be apparent to those of skill in the art having the benefit of the disclosure herein.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
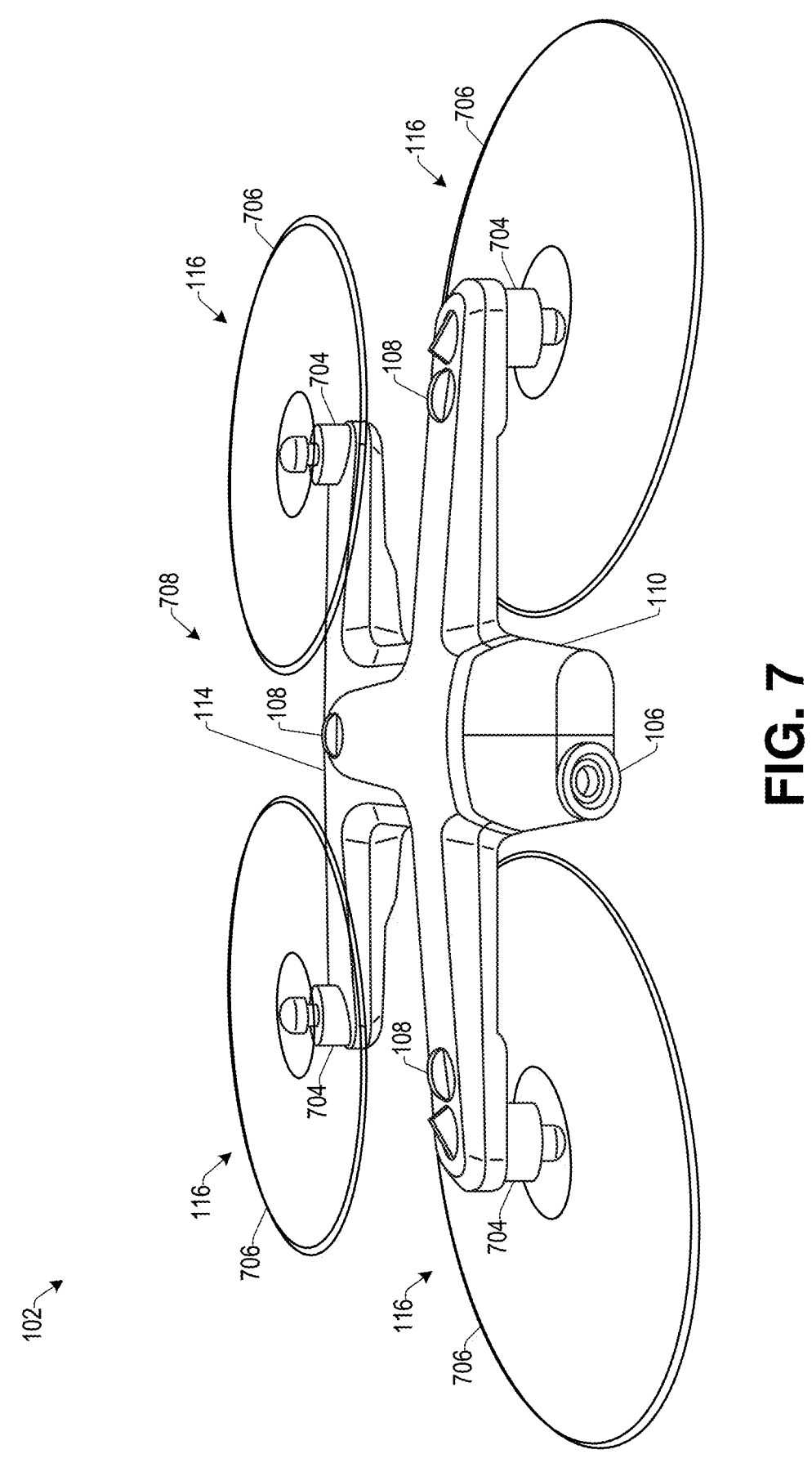
FIG. 7 illustrates an example configuration of a top side of the UAV according to some implementations.

FIG. 7 illustrates an example configuration of a top side of the UAV 102 according to some implementations. In this example, the UAV 102 includes the propulsion devices 116 including four motors 704 and propellers 706. In this example, the UAV 102 is illustrated as a quadcopter drone, but implementations herein are not limited to such.

The UAV 102 includes a plurality of the second cameras 108 mounted on the body 114 of the UAV 102 and that may be used as navigation cameras in some cases. The UAV 102 further includes the aimable first camera 106 that may include a higher-resolution image sensor than the image sensors of the wider-angle cameras 108. In some cases, the first camera 106 includes a fixed focal length lens. In other cases, the first camera 106 may include a mechanically controllable, optically zoomable lens. The first camera 106 is mounted on the gimbal 110 that enables aiming of the first camera 106 in approximately a 180 degree hemispherical area to support steady, low-blur image capture and object tracking. For example, the first camera 106 may be used for capturing high resolution images of target objects, providing object tracking video, or various other operations.

In this example, three second cameras 108 are spaced out around the top side 708 of the UAV 102 and covered by respective fisheye lenses to provide a wide field of view and to support stereoscopic computer vision. The wider-angle cameras 108 on the top side 708 of the UAV 102, as well as those on the bottom side discussed below, may be precisely calibrated with respect to each other following installation on the body 114 of the UAV 102. As a result of the calibration, for each pixel in each of the images captured by the respective wider-angle cameras, the precise corresponding three-dimensional (3D) orientation with respect to a virtual sphere surrounding the UAV may be determined in advance. In some cases, six wider-angle cameras 108 are employed with FOVs sufficiently wide (e.g., 180 degree FOV, 200 degree FOV, etc.) and are positioned on the body 114 of the UAV 102 for covering the entire spherical space around the UAV 102.

Figure 8:
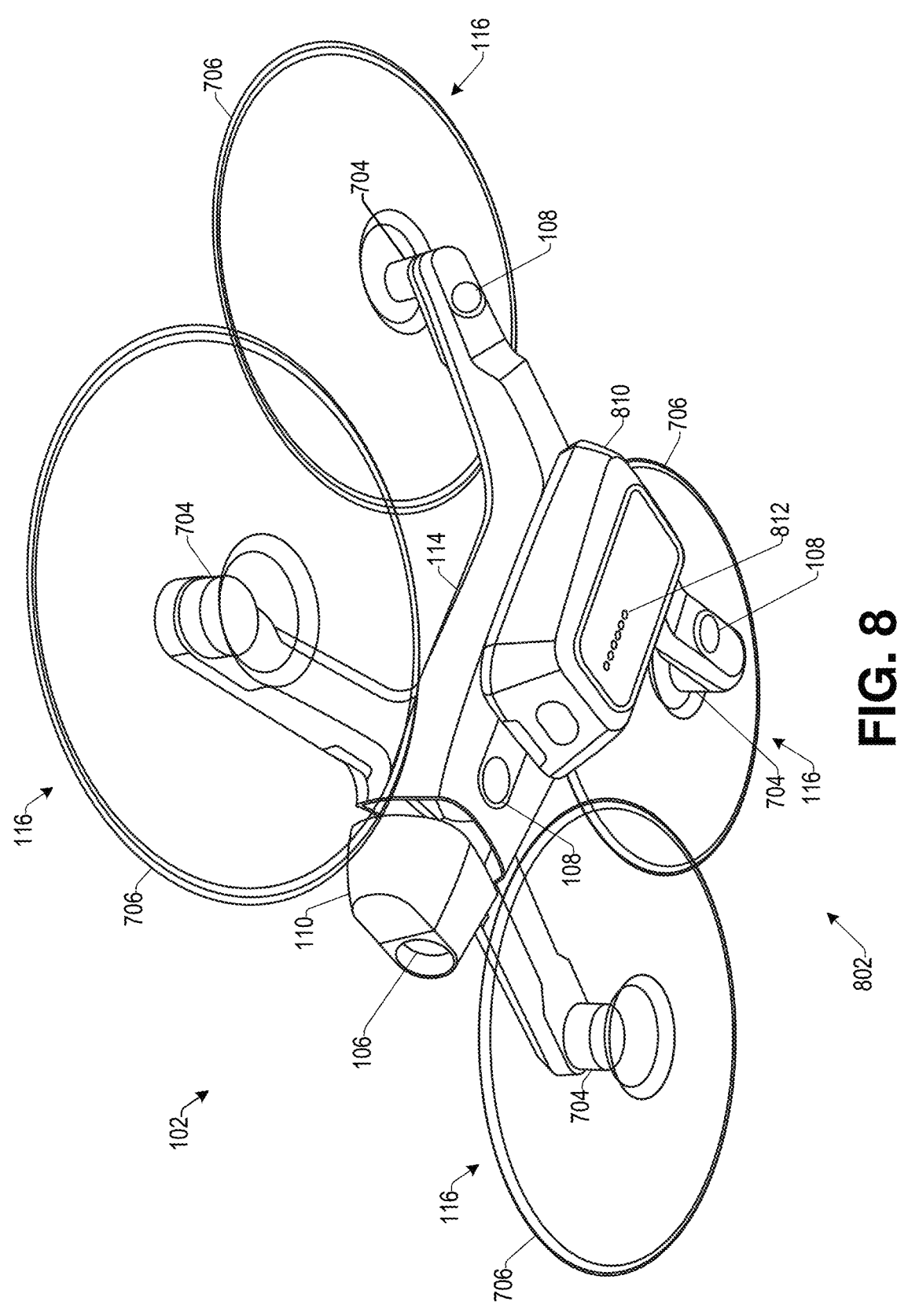
FIG. 8 illustrates an example configuration of a bottom side of the UAV according to some implementations.

FIG. 8 illustrates an example configuration of a bottom side of the UAV 102 according to some implementations. From this perspective three more second cameras 108 arranged on the bottom side 802 of the UAV 102 are illustrated. The second cameras 108 on the bottom side 802 may also be covered by respective fisheye lenses to provide a wide field of view and to support stereoscopic computer vision. This array of second cameras 108 (e.g., three on the top side and three on the bottom side of the UAV 102) may enable visual inertial odometry (VIO) for high resolution localization and obstacle detection and avoidance. For example, the array of second cameras 108 may be used to scan a surrounding area to obtain range data and provide image information that can be used to generate range maps indicating distances to objects detected in the FOVs of the second cameras 108, such as for use during autonomous navigation of the UAV 102 or for determining the distance of surfaces from the UAV 102.

The UAV 102 may also include a battery pack 810 attached on the bottom side 802 of the UAV 102, with conducting contacts 812 to enable battery charging. The UAV 102 also includes an internal processing apparatus including one or more processors and a computer-readable medium (not shown in FIG. 8) as well as various other electronic and mechanical components. For example, the UAV 102 may include a hardware configuration as discussed with respect to FIG. 6 below.

Figure 9:
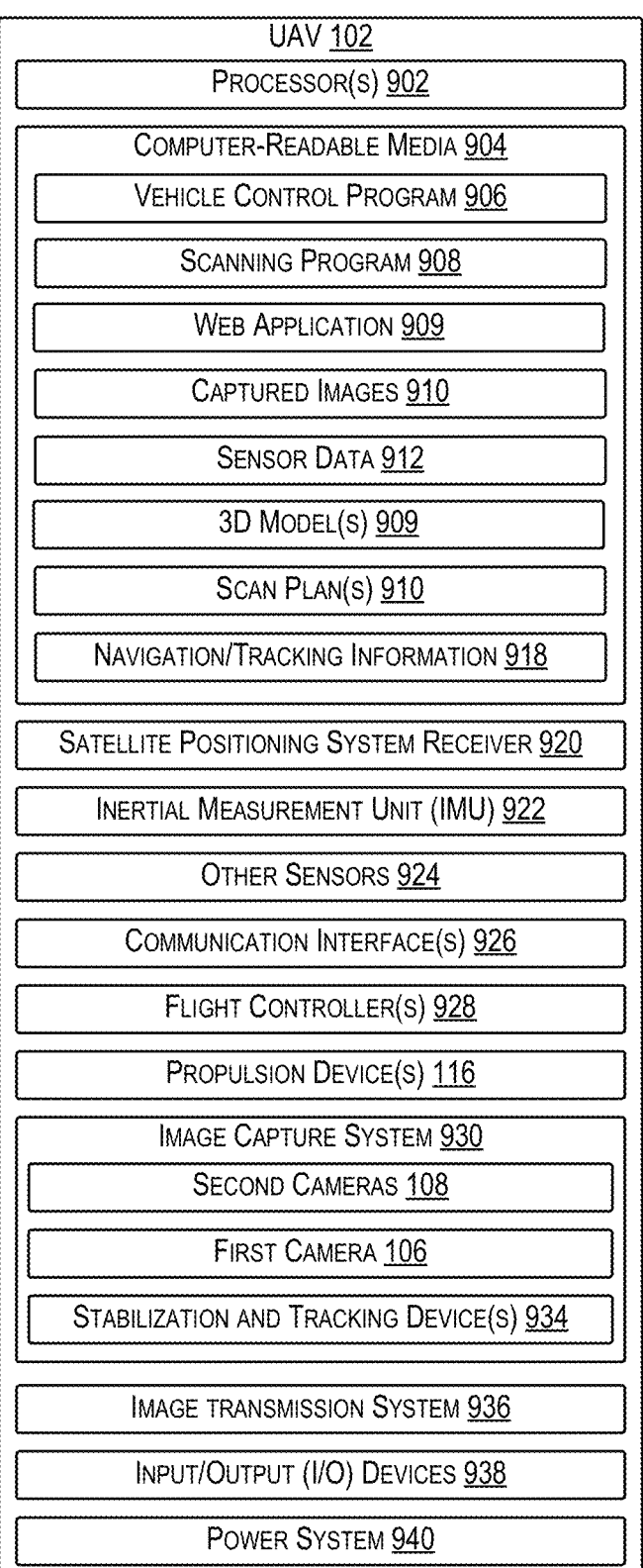
FIG. 9 illustrates select components of an example UAV according to some implementations.

FIG. 9 illustrates select components of an example UAV 102 according to some implementations. In the examples herein, the UAV 102 may sometimes be referred to as a "drone" and may be implemented as any type of UAV capable of controlled flight without a human pilot onboard. For instance, the UAV 102 may be controlled autonomously by one or more onboard processors 902 that execute one or more executable programs. Additionally, or alternatively, the UAV 102 may be controlled via a remote controller, such as through a remotely located controller 104 operated by a human pilot and/or controlled by an executable program executing on or in cooperation with the controller 104.

In the illustrated example, the UAV 102 includes the one or more processors 902 and one or more computer readable media 904. For example, the one or more processors 902 may execute software, executable instructions, or the like, for controlling the flight, navigation, image capture, and other functions of the UAV 102. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, graphics processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other executable code and data. Such computer-readable media 904 may include, but is not limited to, RAM, ROM, EEPROM, flash memory or other memory technology, optical storage, solid state storage, magnetic storage, or any other medium that can be used to store the desired information and that can be accessed by a computing device. Depending on the configuration, the computer-readable media 904 may be a type of computer-readable storage media and/or may be a tangible non-transitory media to the extent that, when mentioned herein, non-transitory computer-readable media exclude media such as energy, carrier signals, electromagnetic waves, and signals per se.

The computer-readable media 904 may be used to store any number of functional components that are executable by the processor(s) 902. In many implementations, these functional components comprise instructions or programs that are executable by the processors 902 and that, when executed, specifically configure the one or more processors 902 to perform at least some of the actions attributed above to the UAV 102. Functional components stored in the computer-readable media 904 may include a vehicle control program 906 that may be executed to control autonomous navigation of the UAV 102, as well as for controlling the first camera 106 for aiming the first camera 106 at a target and capturing images thereof. The functional components further include a scanning program 908 that may be executed by the one or more processors to perform at least a portion of the scan target scanning functions described herein. In addition, the functional components may include a web application 909 that may be accessed by the controller 104 to use for controlling the UAV 102. For example, the web application 909 may execute on a browser on a user device connected to the controller 104, such as to enable the user to receive images of a current view of the UAV 102, view scan progress of the UAV 102 during scanning of a scan target, receiving scanned images, 3D models, and the like.

In addition, the computer-readable media 904 may store data used for performing the navigation and scanning operations described herein. Thus, the computer-readable media 404 may store, at least temporarily captured images 910, sensor data 912, one or more 3D models 914, and one or more scan plans 916. In addition, the computer-readable media may store navigation/tracking information 918 that may be used to navigate the UAV 102 according to one or more instructions, as well as to provide information related to one or more targets for imaging. In addition, the UAV 102 may include many other logical, programmatic, and physical components, of which those described herein are merely examples that are related to the discussion.

To assist in navigation, the UAV 102 may include a global navigation satellite system (GNSS) receiver or other satellite positioning system receiver 920 onboard the UAV 102. The GNSS receiver 920 may be able to receive signals from one or more satellites of a GNSS, such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), and so forth.

The UAV 102 may further include an inertial measurement unit (IMU) 922. In some examples, the IMU 922 may be configured to detect linear acceleration and gravity using one or more accelerometers and to detect a rotational rate using one or more gyroscopes. As one example, the IMU 922 may be a self-contained system with a three-axis gyroscope, a three-axis accelerometer, and an embedded processor for processing inputs from the gyroscope and the accelerometer for providing an output of acceleration, attitude, and the like. For instance, the IMU 922 may measure and report the velocity, acceleration, orientation, and gravitational forces on the UAV 102, such as by using the combination of the gyroscopes and accelerometers. In addition, the UAV 102 may include other sensors 924, such as a magnetometer, a barometer, proximity sensors, lidar, radar, ultrasonic, or any of various other types of sensors as is known in the art.

Furthermore, the UAV 102 may include the one or more communication interfaces 926, one or more flight controllers 928, the one or more propulsion devices 116, and an image capture system 930. The image capture system 930 may include the second cameras 108, the first camera 106, and one or more stabilization and tracking devices 934, such as the gimbal 110 discussed above.

In addition, the UAV 102 may include an image transmission system 936, input/output (110) devices 938, and a power system 940. The components included in the UAV 102 may be able to communicate at least with the one or more processors 902, such as over one or more communication buses, signal lines, or the like (not shown).

The UAV 102 may include more or fewer components than shown in the example of FIG. 9, may combine two or more components as functional units, or may have a different configuration or arrangement of the components. Some of the various components of the example UAV 102 shown in FIG. 9 may be implemented in hardware, software or a combination of both hardware and software, including one or more signal processing and/or application specific integrated circuits.

The flight controller(s) 928 may include a combination of hardware and/or software configured to receive input data (e.g., sensor data, image data, generated trajectories, or other instructions) from the vehicle control program 906, interpret the data and/or instructions, and output control signals to the propulsion devices 116 of the UAV 102. Alternatively, or in addition, the flight controller(s) 928 may be configured to receive control commands generated by another component or device (e.g., processors 902 and/or controller 104), interpret those control commands and generate control signals to the propulsion devices 116 of the UAV 102. In some implementations, the previously mentioned vehicle control program 906 of the UAV 102 may comprise the flight controller(s) 928 and/or any one or more of the other components of the UAV 102. Alternatively, the flight controller(s) 928 may exist as a component separate from the vehicle control program 906.

The communication interface(s) 926 may enable transmission and reception of communications signals, for example, via a radiofrequency (RF) transceiver. In some implementations, the communication interface(s) 926 may include RF circuitry (not shown in FIG. 9). In such implementations, RF circuitry may convert electrical signals to/from electromagnetic signals and communicate with communications networks and other communications devices via the electromagnetic signals. The RF circuitry may include known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). For example, communications may be over a wide area network (WAN), a local area network (LAN), or a network of networks such as the Internet.

The communication interface(s) 926 may include one or more interfaces and hardware components for enabling communication with various other devices, such as over one or more networks. For example, communication interface(s) 926 may enable communication through one or more of the Internet, cable networks, cellular networks, wireless networks (e.g., Wi-Fi) and wired networks (e.g., fiber optic and Ethernet), as well as close-range radio communications, such as BLUETOOTH®, and the like, as additionally listed elsewhere herein. For example, 900 MHz, 2.4 GHz and 5.8 GHz are the most common radio frequencies used for communicating with UAVs, but implementations herein are not limited to any particular frequency.

The input/output (I/O) devices 938 may include physical buttons (e.g., push buttons, rocker buttons, etc.), LEDs, dials, displays, touch screen displays, speakers, and so forth, that may be used to interact with, or otherwise operate certain features of the UAV 102. The UAV 102 also includes the power system 940 for powering the various components. The power system 940 may include a power management system, one or more power sources (e.g., battery, alternating current, etc.), a recharging system, a power failure detection circuit, a power converter or inverter, a power status indicator (e.g., a light-emitting diode (LED)) and any other components associated with the generation, management and distribution of power in a computerized device.

In some examples, similar to an airplane, the UAV 102 may utilize fixed wings or other aerodynamic surfaces along with one or more propulsion devices 116 to achieve lift and navigation. Alternatively, in other examples, similar to a helicopter, the UAV 102 may directly use the one or more propulsion device(s) 116 to counter gravitational forces and achieve lift and navigation. Propulsion-driven lift (as in the case of helicopters) may offer advantages in some implementations because it allows for more controlled motion along all axes as compared with UAVs that employ fixed aerodynamic surfaces for lift.

The UAV 102 illustrated in FIGS. 1 and 7-9 is an example provided for illustrative purposes. The UAV 102 in accordance with the present disclosure may include more or fewer components than are shown. For example, while a quadcopter is illustrated, the UAV 102 is not limited to any particular UAV configuration and may include hexacopters, octocopters, fixed wing aircraft, or any other type of independently maneuverable aircraft, as will be apparent to those of skill in the art having the benefit of the disclosure herein. Furthermore, while techniques for controlling the navigation of an autonomous UAV 102 for performing a scan of a scan target are described herein, the described techniques may similarly be applied to guide navigation by other types of vehicles (e.g., spacecraft, land vehicles, watercraft, submarine vehicles, etc.).

Figure 10:
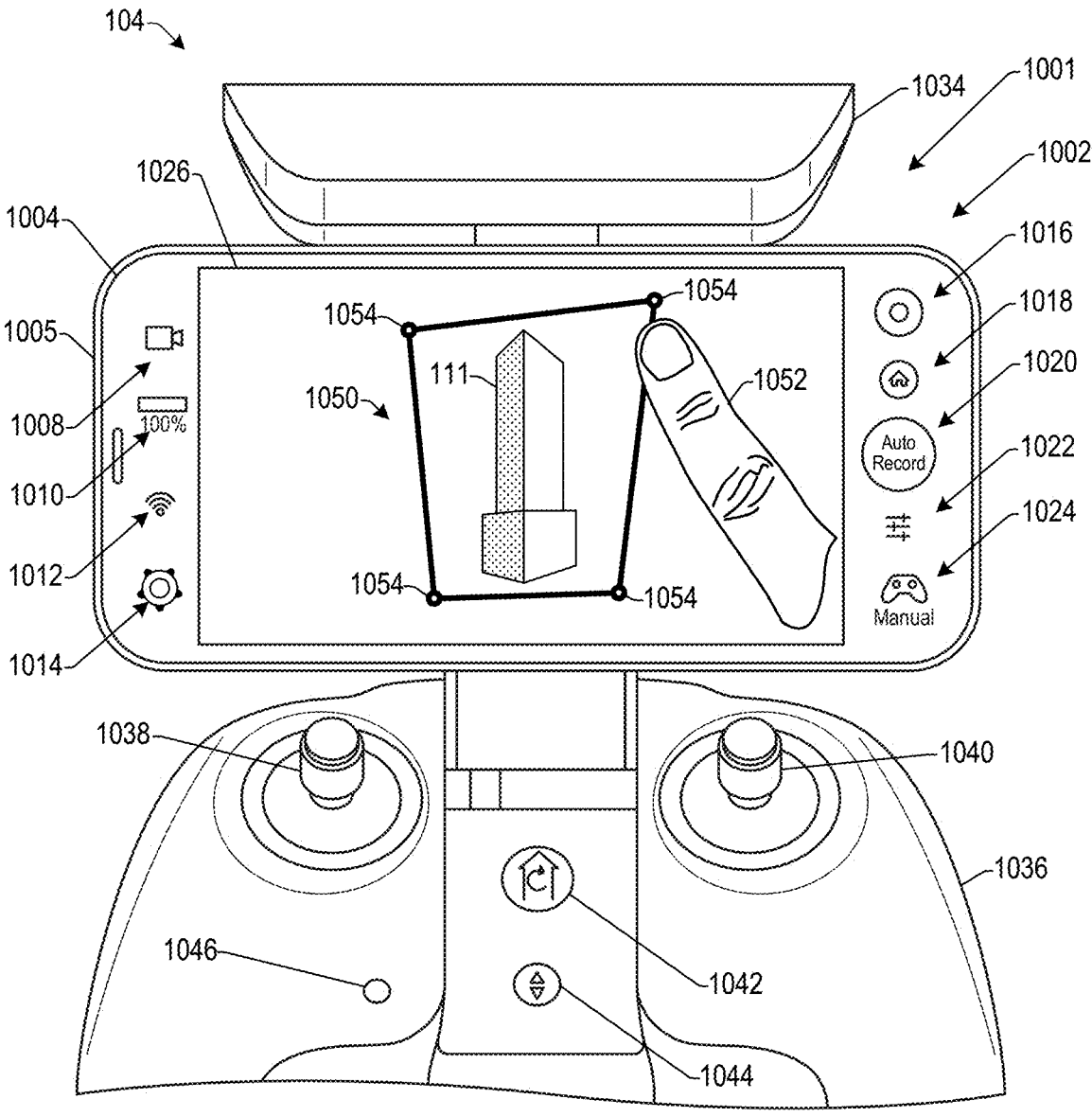
FIG. 10 illustrates an example configuration of the controller, which includes a computing device according to some implementations.

FIG. 10 illustrates an example configuration of the controller 104, which includes a computing device 1001 according to some implementations. The controller 104 may present a graphical user interface (GUI) 1002 for controlling the UAV 102 and viewing the images 118 received from the UAV 102. The controller 104 may include a touchscreen 1004 that may correspond to the display 124 discussed above with respect to FIG. 1. The touchscreen 1004 may provide virtual controls and status indicators for controlling and viewing a status of the UAV 102. For example, a camera setting virtual control 1008 may enable the user to control the resolution and other settings of at least the first camera 106 on the UAV 102. Furthermore, a battery charge level indicator 1010 indicates the current condition of the battery on the UAV 102. A signal strength indicator 1012 may indicate a current signal strength of a communication signal with the UAV 102. A settings virtual control 1014 may enable the user to control the settings of the controller 104. Furthermore, a map virtual control 1016 may enable the user to view the location of the UAV 102 on a map. A home virtual control 1018 may enable the user to return to a home screen of the user interface 1002. A recording virtual control 1020 may enable the user to control the start or stop of recording of a scene currently in the field of view of the first camera 106. A skills virtual control 1022 may enable the user to control skill settings for the UAV 102. A manual virtual control 1024 may enable the user to switch between manually piloting the UAV 102 or allowing the UAV 102 to autonomously pilot itself.

In addition, the user interface may present an image 1026 (e.g., a live video image) of a current field of view of the UAV 102. In this example, the touchscreen 1004 is part of the computing device 1001, such as a smartphone, tablet computing device, or other computing device that may be mounted on the controller 104 using a controller attachment 1034. The controller 104 may further include a controller body 1036 that includes a plurality of physical controls that may be used to manually control the UAV 102, such as a left joystick 1038, a right joystick 1040, a home button 1042, a launch/land button 1044, an LED status indicator 1046 that indicates a status of the controller 104, as well as other physical controls not visible in this view. In some examples, a Wi-Fi antenna may be included in the controller attachment 1034 so that the controller 104 may provide range-extending communication capabilities for longer distance communications with the UAV 102 than may be possible with the computing device 1001 alone.

In some cases, the computing device 1001 (or another computing device that is remote from the UAV 102) may execute an application on a processor of the computing device 1001. As one example, the application may include a browser that executes a web application that may be served or otherwise provided by the UAV 102 to the computing device 1001. For instance, the web application (or another application executed on the computing device 1001) may provide the user interface 1002 discussed above and may provide other functionalities described herein with respect to the computing device 1001, such as enabling communication with the UAV 102, enabling remote control of the UAV 102, and the like. Furthermore, in some cases, the application may enable wireless connection of the computing device 1001 to the controller 104 such as via BLU-ETOOTH® radio, Wi-Fi, or the like.

In some implementations, a portion of the processing that might otherwise be performed by the UAV 102 (e.g., image processing and control functions) may instead be performed by an application running on a processor of the computing device 1001 that is remote from the UAV 102. Furthermore, in some examples, the processing workload may be divided between the processor(s) on the UAV 102 and the processor(s) on the computing device 1001, such as to achieve reduced processing times. Numerous other variations will be apparent to those of skill in the art having the benefit of the disclosure herein.

In the illustrated example, suppose that the user is using the controller 104 to select the scan target 111 for indicating to the UAV 102 that the scan target 111 is to be scanned as discussed above with respect to FIG. 1. Accordingly, the user may select a captured image of the desired scan target 111 and may manipulate the user interface 1002 to draw a polygon or other 2D shape 1050 around the scan target or a portion of the scan target 111 for specifying the scan target 111 to the UAV 102. Thus, the user may specify an area in the user interface 1002 for indicating the scan target 111 to the UAV 102. For instance, the user may use a finger 1052, or the like, to control at least three reference points, i.e., handles 1054, to draw a polygonal perimeter (i.e., a boundary) around the scan target 111. The UAV 102 may be configured to explore the scan target 111 within the specified perimeter, and in some examples, may present a volume prism around the detected scan target corresponding to the specified perimeter. For example, the user may be able to adjust the distance to the surfaces and other scan parameters before the UAV 102 starts the scan.

Additionally, while a polygon is shown in the example of FIG. 8, in other examples, any other technique may be used for creating a perimeter around or on a scan target. For example, the user may draw a circle, oval, irregular line, etc. on or around the scan target in the user interface 1002. Alternatively, in other examples, the user interface 1002 may enable manipulation of a bounding volume rather than a bounding area for indicating the scan target 111 to the UAV 102. Further, in still other examples, the user may tap on or otherwise select the image of the scan target 111 in the user interface 1002 for indicating the scan target to the UAV 102. In some examples, the UAV 102 may employ a machine-learning model for recognizing the scan target 111 based on an indication received via the user interface 1002. As another example, the user may provide the UAV 102 with specified latitude and longitude coordinates of the scan target 111, and the UAV 102 may navigate itself to the specified coordinates to obtain the image of the scan target 111. Numerous other variations will be apparent to those of skill in the art having the benefit of the disclosure herein.

Figure 11:
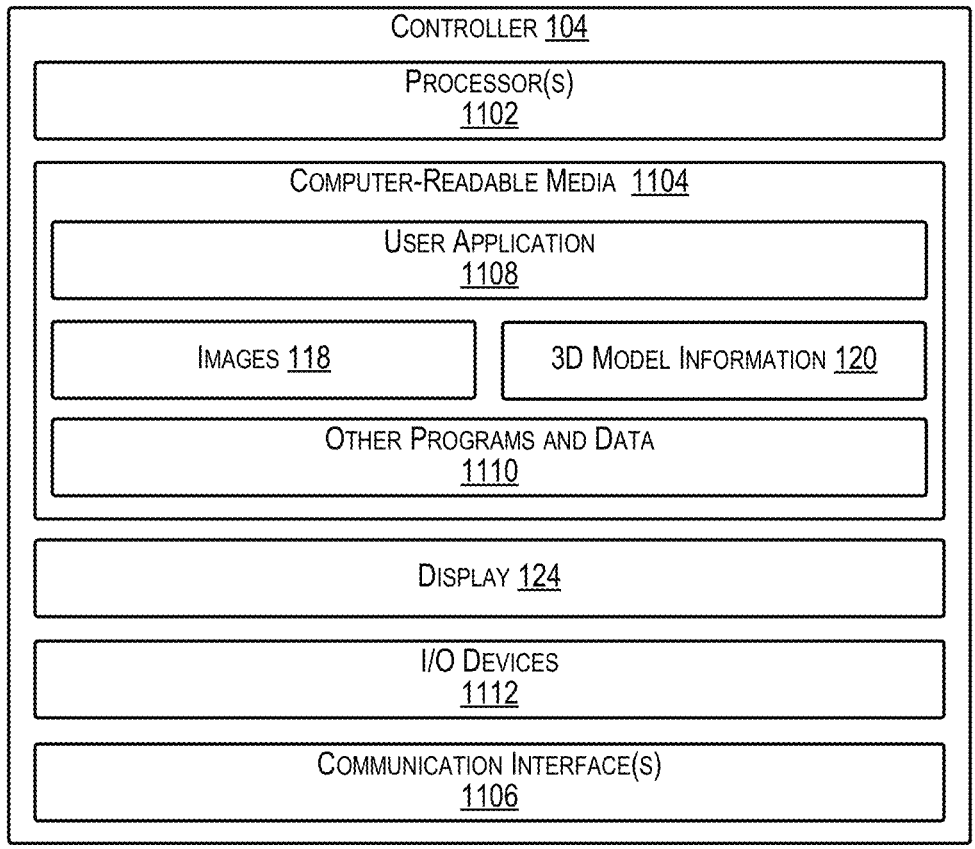
FIG. 11 illustrates select components of an example controller according to some implementations.

FIG. 11 illustrates select components of an example controller 104 according to some implementations. The controller 104 in this example may include components such as at least one processor 1102, one or more computer-readable media 1104, one or more communication interfaces 1106, and one or more input/output (I/O) devices 1108. For instance, at least some of the processor(s) 1102, the computer-readable media, the communication interfaces 1106, and the I/O devices 1108 may be provided by a computing device 1001 (not separately shown in FIG. 11) connected to or otherwise included with the controller 104.

Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the controller 104, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the controller 104 may access external storage, such as storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the controller 104. Functional components of the controller 104 stored in the computer-readable media 1104 may include the user application 1108, which may enable the user to use the controller to control the UAV 102 remotely as discussed above. In some examples, the user application 1108 may access the web application on the UAV 102, while in other examples, the user application 1108 may be a standalone controller application.

In addition, the computer-readable media 1104 may also store data, data structures, and the like, that are used by the functional components. For example, the computer-readable media 1104 may store at least temporarily the images 118 received from the UAV 102, and may also store the 3D model information 120 received from the UAV 102 in some examples. Depending on the type of the controller 104, the computer-readable media 1104 may also optionally include other functional components and data, such as other programs and data 1110, which may include applications, programs, drivers, etc., and the data used or generated by the functional components. Further, the controller 104 may include many other logical, programmatic and physical components, of which those described are merely examples that are related to the discussion herein.

The communication interface(s) 1106 may include one or more interfaces and hardware components for enabling communication with various other devices, such as over the network(s) 113 or directly. For example, communication interface(s) 1106 may enable communication through one or more of the Internet, cable networks, cellular networks, wireless networks (e.g., Wi-Fi) and wired networks, one-way or two-way radio transmission, as well as close-range communications such as BLUETOOTH®, and the like, as additionally described elsewhere herein.

In addition, the controller 104 may include the display 124, which may include the touchscreen 1004 discussed above with respect to FIG. 10. The controller 104 may further include a plurality of other I/O devices 1112, such as discussed above with respect to FIG. 10.

Figure 12:
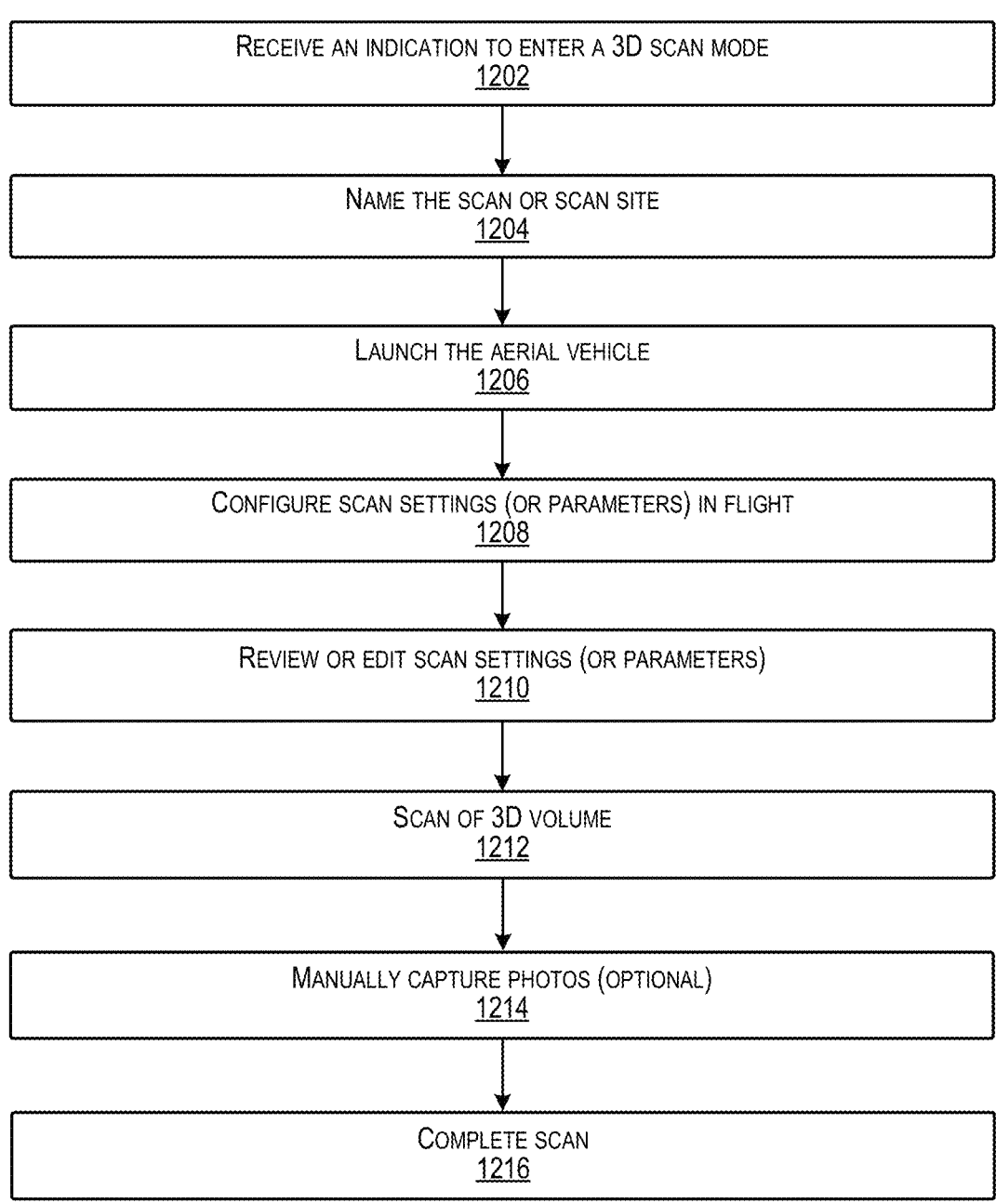
FIG. 12 is a flow diagram illustrating an example process for scanning a scan target (or scan volume) according to some implementations.

FIG. 12 is a flow diagram illustrating an example process 1200 for scanning a scan target (or scan volume) according to some implementations. In some examples, at least a portion of the process 1200 may be executed by a computing device that is remote from the UAV 102, such as the controller 104 and/or the service computing device(s) 126. Alternatively, in some examples, at least a portion of the process 500 may be performed by the UAV 102, such as by executing a scanning program and vehicle control program.

At 1202, the controller receives an indication to enter a 3D scan mode. At 1204, the controller presents a user with the ability to name the scan and/or the scan site. At 1206, the controller receives an instruction to launch the aerial vehicle and transmits the instruction to launch to the aerial vehicle. The aerial vehicle receives the instruction to launch and subsequently directs its propulsion system to takeoff (or launch). At 1208, a user can configure scan settings (or parameters) while the aerial vehicle is in flight. An example of configuring scan settings for a 3D scan is discussed and shown in more detail with respect to FIG. 13.

At 1210, the controller presents the settings (parameters) to a user for review and/or editing. At 1212, the controller directs the aerial vehicle to begin the scan of the 3D volume. At 1214, the controller presents a user with the ability to manually capture photos. Lastly, at 1216, the scan is completed and results displayed to a user via a controller.

FIG. 13 is a flow diagram illustrating an example process 1300 for configuring parameters (or settings) for scanning a 3D scan volume according to some implementations. In some examples, at least a portion of the process 1300 may be executed by a computing device that is remote from the UAV 102, such as the controller and/or the service computing device(s) 126. Alternatively, in some examples, at least a portion of the process 500 may be performed by the UAV 102, such as by executing a scanning program and vehicle control program.

At 1302, the controller presents a user with a graphical user interface for setting a rally (or return) point. As discussed herein, the aerial vehicle will return to this point upon completion of the scan, when the battery level is low, or when a communication connection is lost.

At 1304, the controller presents a user with a graphical user interface for setting a scan floor. The scan floor defines the bottom of the 3D volume to be scanned. In some examples, the scan floor also defines the bottom of the scan in the visual geofence and the edge model viewer. If launching from the ground, the scan floor may be automatically set to the ground altitude.

At 1306, the controller presents a user with a graphical user interface for setting the scan ceiling. The scan ceiling defines the top of the 3D volume to be scanned. In some examples, the scan ceiling also defines the top of the scan in the visual geofence and the edge model viewer. Generally, the scan ceiling is set above the structure that is to be scanned so that the 3D volume includes the entirety of the structure. In some examples a default ceiling is set at a particular distance above the launch point (or above the floor).

At 1308, the controller presents a user with a graphical user interface for setting lateral pillar boundaries. As discussed herein, the lateral pillar boundaries are set to encompass the structure to be scanned in a polygon. The lateral pillar boundaries may be presented in augmented reality (and in some implementations in a distinct color) overlaid on a view of the physical environment (either the current view of the aerial vehicle or some preset observer point). In some examples the lateral pillars define the lateral bounds for a visual geofence. In some examples the lateral pillars define the lateral area of a model (of the scanned object) in an edge model viewer. In some examples, to set pillars, a user may fly to a desired location and use a button (e.g., the right shoulder button) to select "Set Pillar." The user may continue placing pillars until the desired structure is encompassed. In some examples a minimum of three pillars must be set to create a three-dimensional (3D) volume, e.g., define the lateral bounds of a polygon around the 3D volume to be scanned. In some examples, edges of the polygon defined by the pillars must not cross each other in order to proceed.

At 1310, the controller presents a user with a graphical user interface for setting the visual geofence. As discussed above, a visual geofence may be set which enables a strict geofence around the scan volume. In some examples, the visual geofence uses the aerial vehicle's visual navigation system to enter and exit the 3D volume from the same location. The aerial vehicle honors the visual geofence during the explore phase (or mode) and the scanning process (or mode), as well as when transitioning between the two processes (or modes). In some examples, the strictness level of the visual geofence can be adjusted (either through parameters or temporarily through user input via the controller or touchscreen, etc.).

At 1312, the controller presents a user with a graphical user interface for setting an augmented reality observer point. The AR observer is the perspective from which a user may observe progress of a scan in augmented reality. The AR observer may be set in a number of ways. For example, the AR observer point may be set automatically. In such instances, "Review Suggestion" means that the aerial vehicle (or drone) will fly to the ceiling of the lateral pillar closest to the takeoff position. The drone will then face the structure (the centroid of the AR polygon-prism). Alternatively, the AR observer point may be set manually. Manually setting the AR observer point allows a user to manually pilot the drone to a preferred vantage point, using a controller (e.g., controller 104). If a user chooses to manually set the location of the AR Observer, the aerial vehicle may automatically ensure that the AR observer point provides the best situational awareness for monitoring the scan's progress. For example, the aerial vehicle may ensure that the AR observer point is no more than 10*m* from the scan volume and tightly frames the structure to be scanned. The aerial vehicle may also automatically ensure that the AR observer point fills the frame vertically and/or horizontally.

Figure 14A:
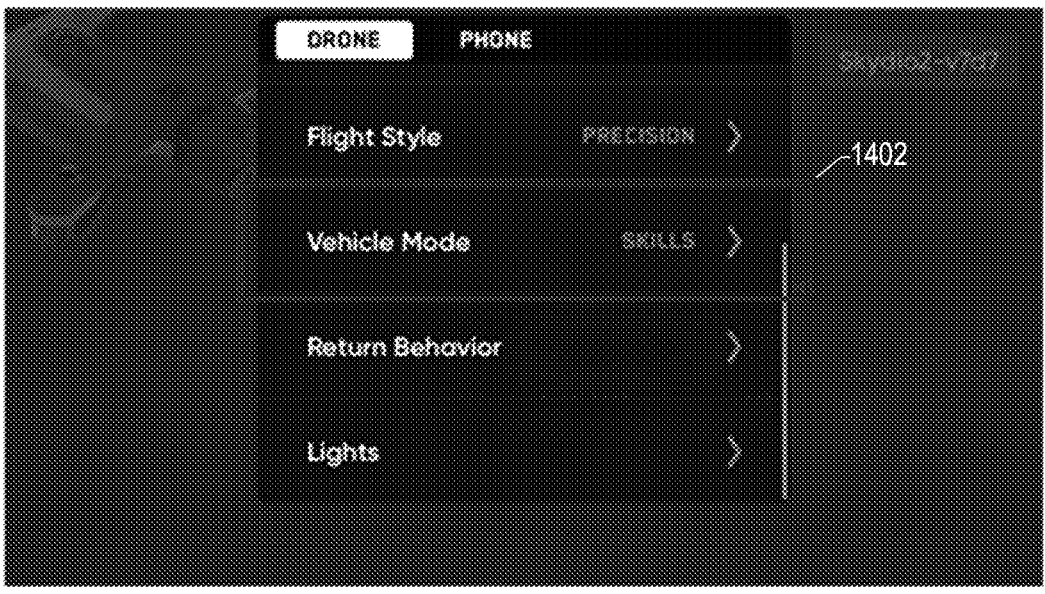
FIGS. 14A-14V illustrate an example graphical user interfaces of an autonomous flight control application on aerial vehicle controller according to some implementations.
Figure 14B:
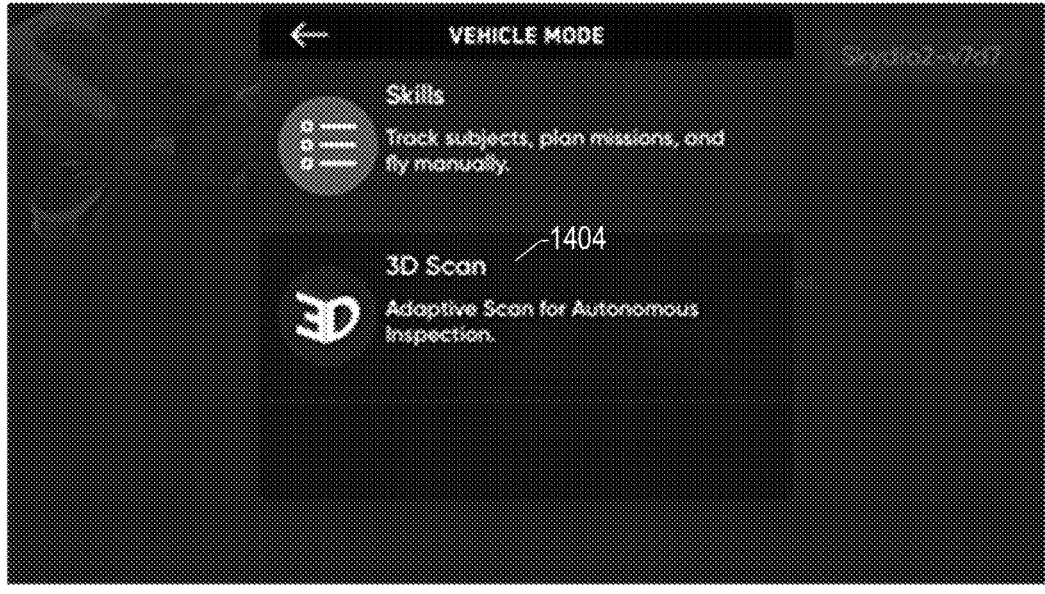
Figure 14C:
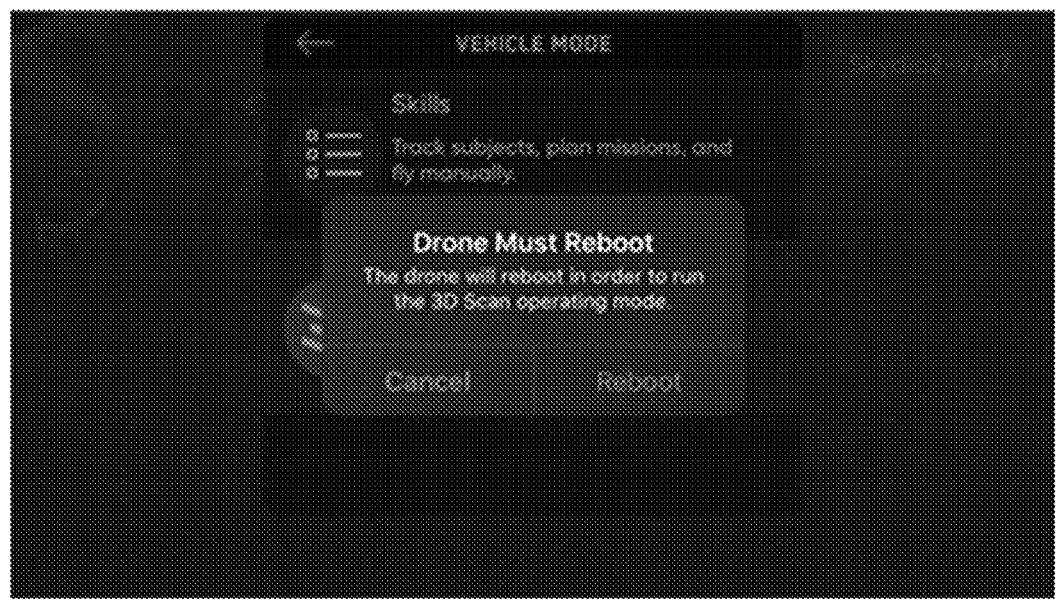
Figure 14D:
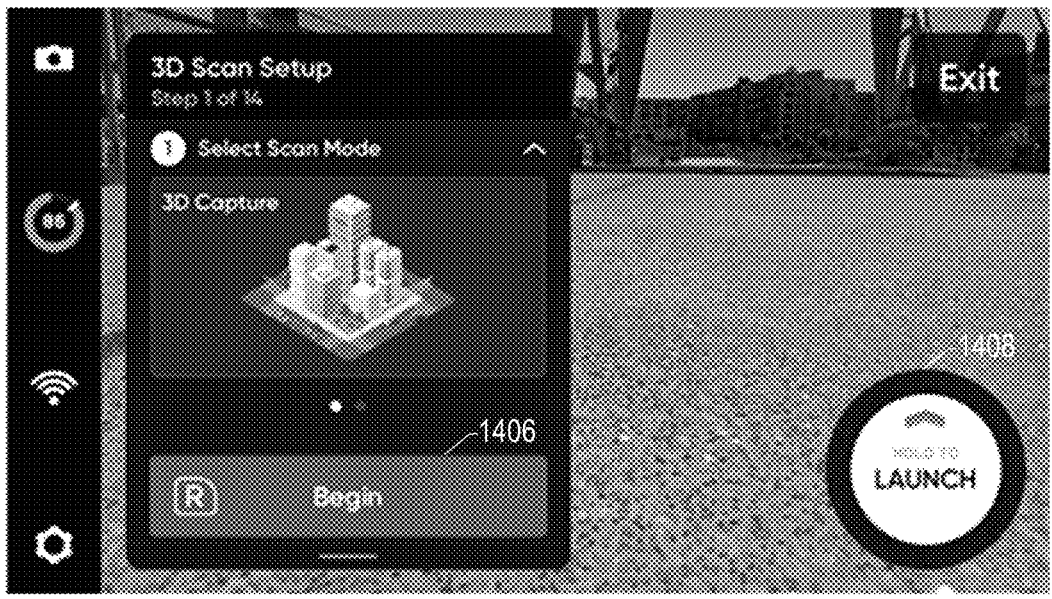
Figure 14E:
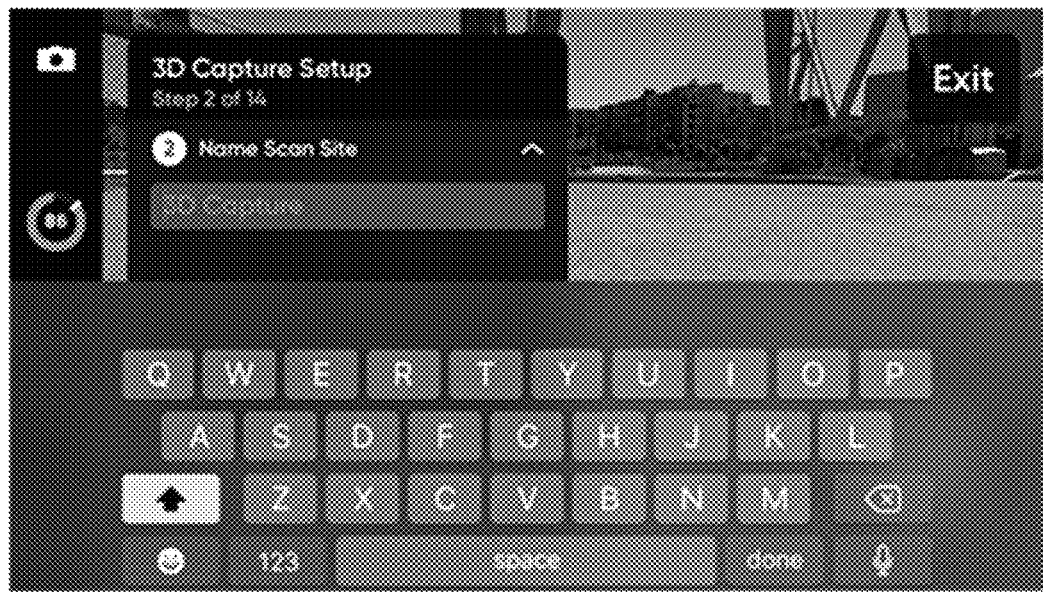
Figure 14F:
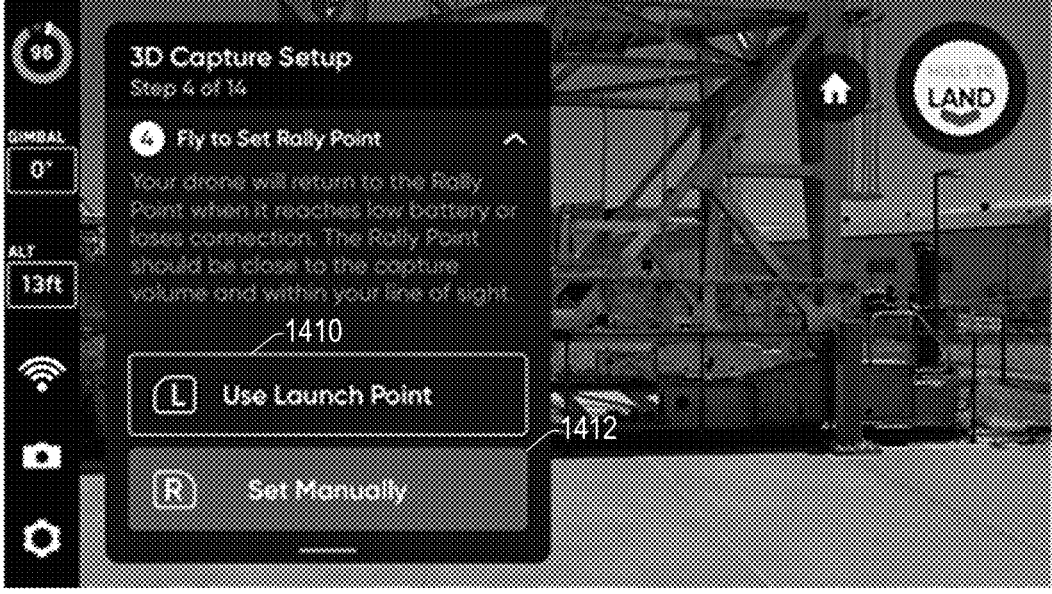
Figure 14G:
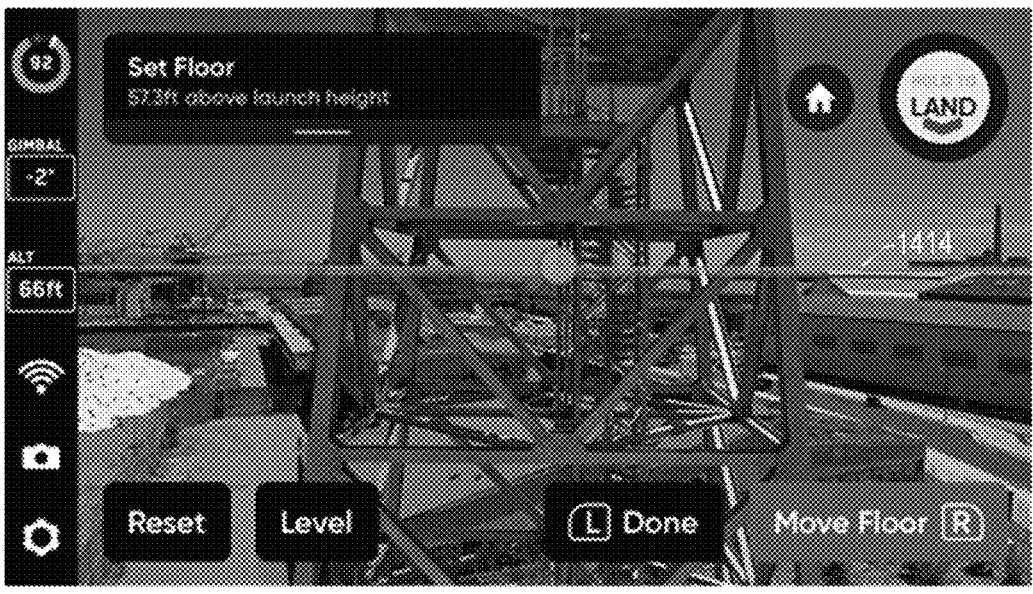
Figure 14H:
Figure 14I:
Figure 14J:
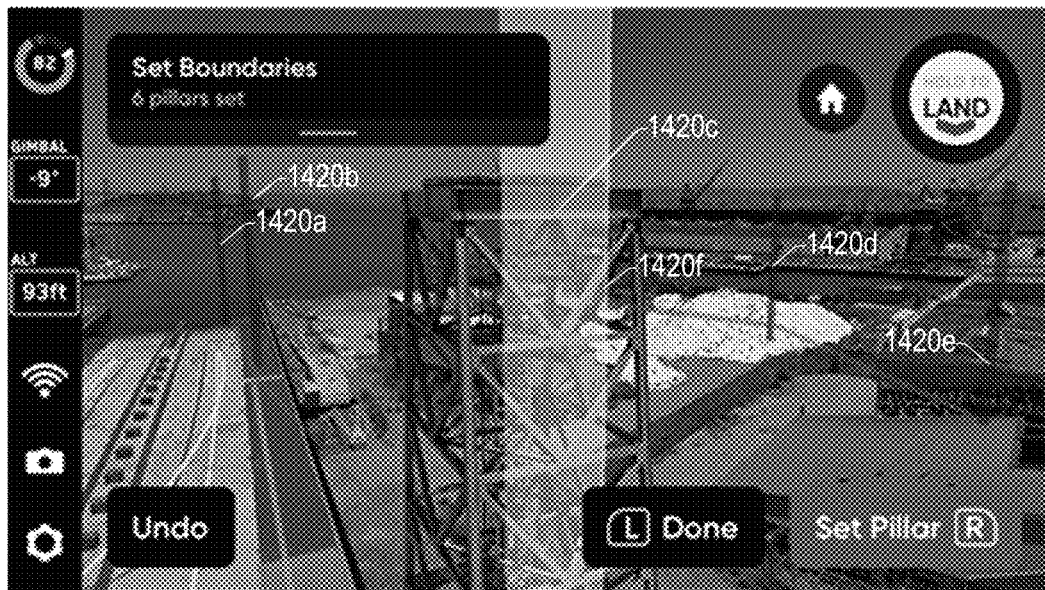
Figure 14K:
Figure 14L:
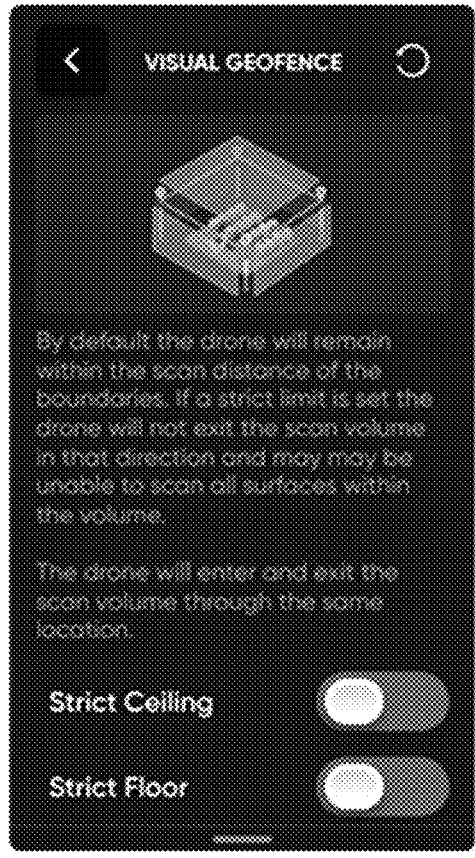
Figure 14M:
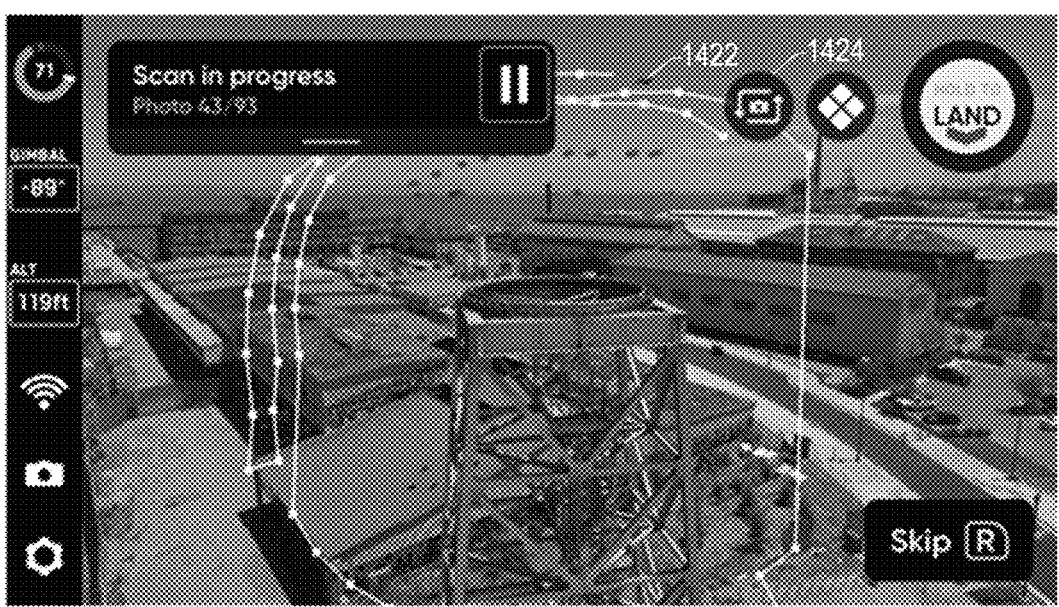
Figure 14N:
Figure 14O:
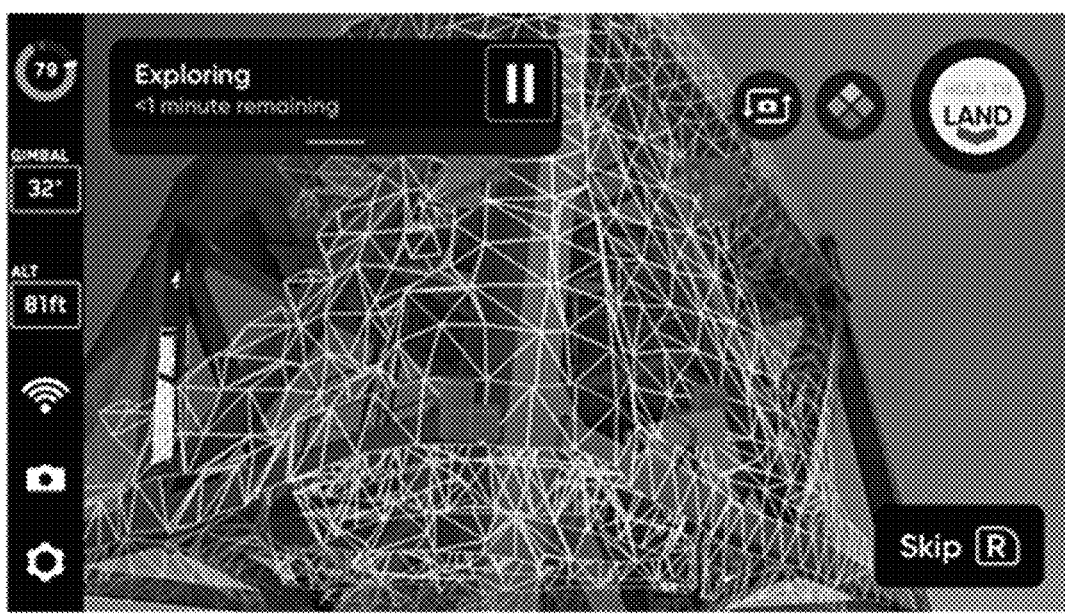
Figure 14P:
Figure 14Q:
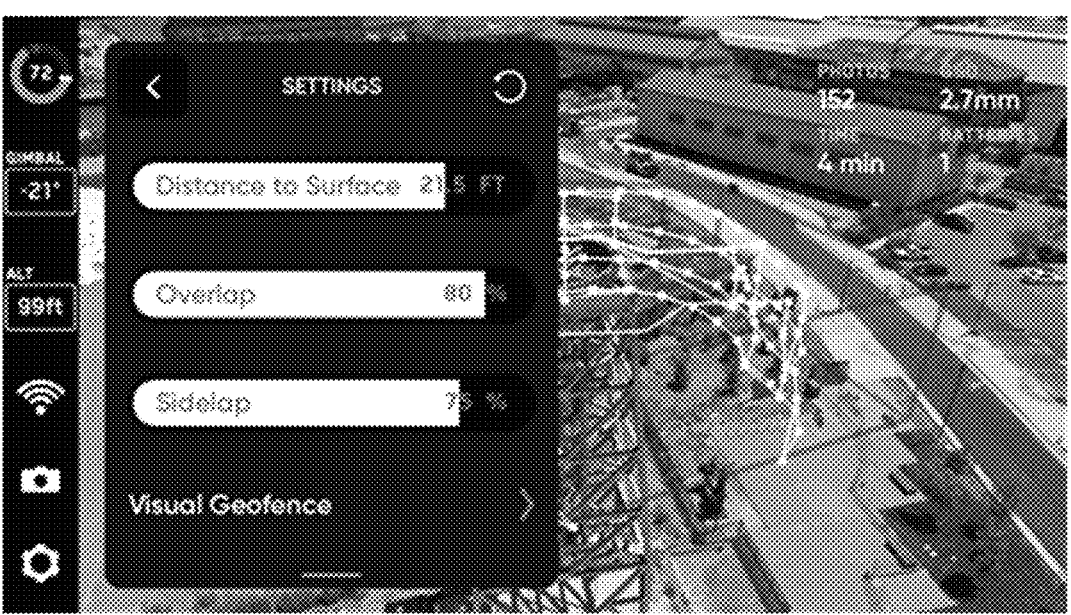
Figure 14R:
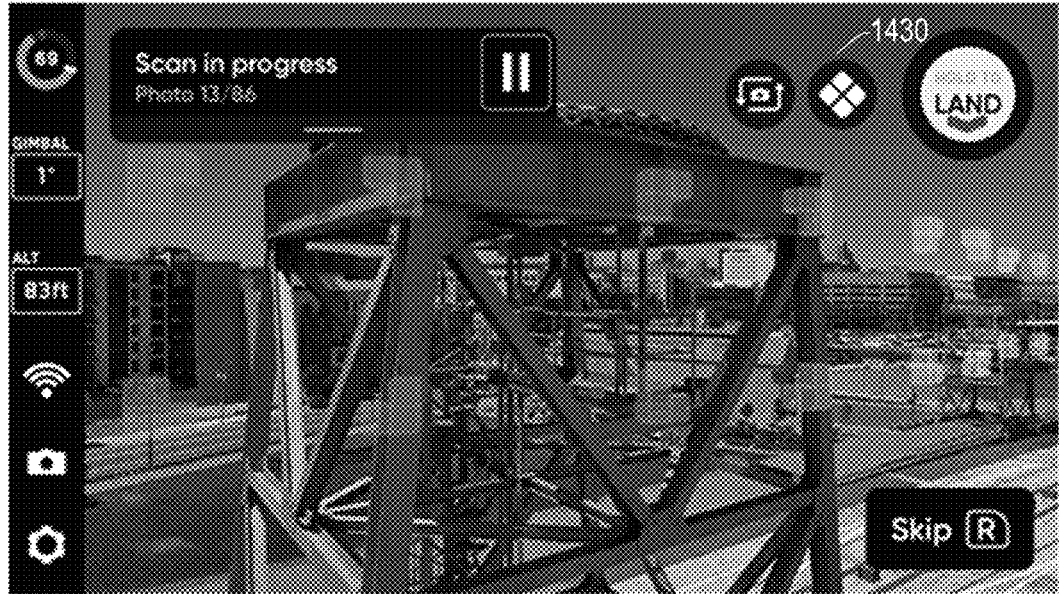
Figure 14S:
Figure 14T:
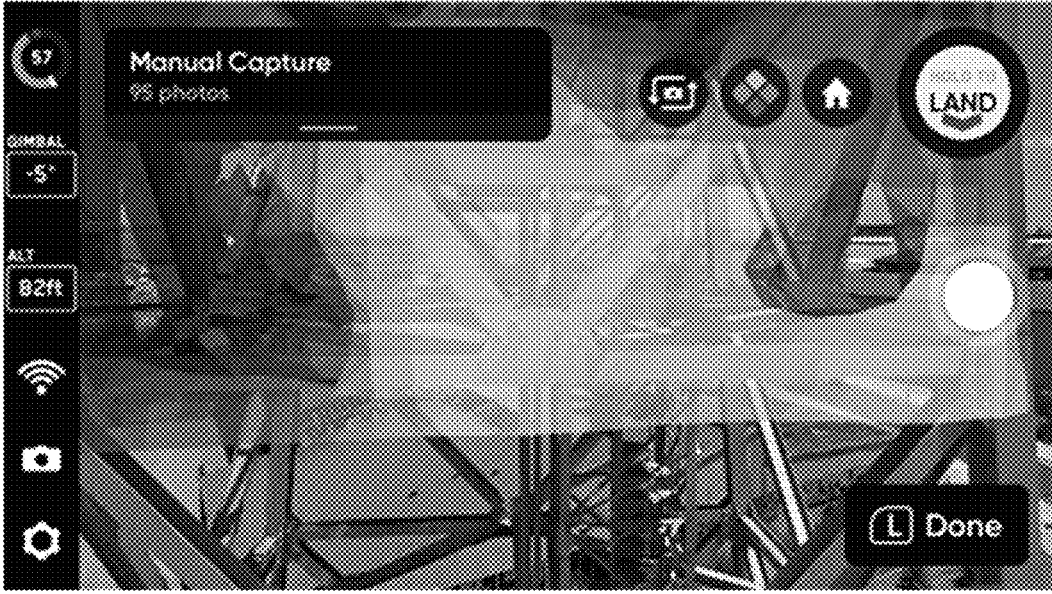
Figure 14U:
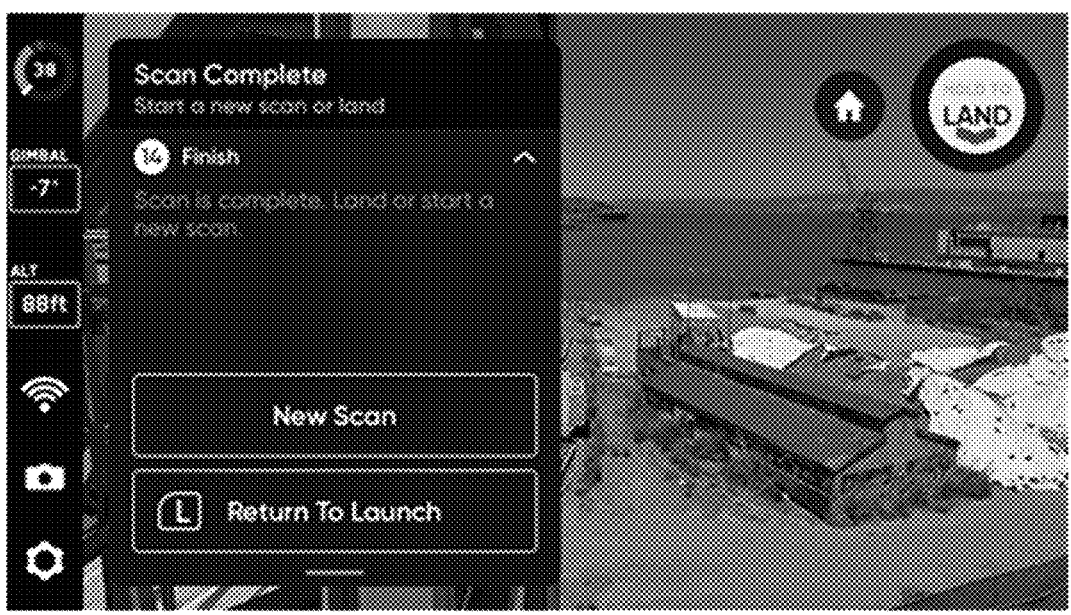
Figure 14V:

FIGS. 14A-14V illustrate an implementation of example graphical user interfaces of an autonomous flight control application on aerial vehicle controller according to some implementations. In this example, the controller 104 and/or the service computing device(s) 126 may present the graphical user interfaces for configuring parameters (or settings) for scanning a structure within three-dimensional (3D) scan volume. Prior to commencing a 3D Capture or 2D Capture, the aerial vehicle first reboots to enter a 3D Scan Mode. FIG. 14A illustrates a graphical user interface presented to a user including a vehicle mode selection 1402. Selecting the vehicle mode selection 1402 causes display of a graphical user interface as shown in FIG. 14B. The graphical user interface as shown in FIG. 14B including selections of a skills mode and 3D scan mode 1404. Selecting 3D scan mode 1404 causes display of a graphical user interface as shown in FIG. 14C which notifies a user that the "Drone Must Reboot" and allows a user to "Cancel" or "Reboot" the Drone operating system.

After the aerial vehicle has finished entering 3D Scan, the graphical user interface as shown in FIG. 14D is displayed or presented. The select 3D Capture as the Scan Mode is shown and selecting "Begin" 1406 on the screen to commence the scan. Alternatively, a user could use the right [R] shoulder button (or another button) on the controller 104. Once selected, a user may be presented with a graphical user interface (not shown) requiring the user to agree to a disclaimer and/or acknowledge that the user will comply with relevant laws and FAA regulations. Next, the graphical user interface shown in FIG. 14E is shown or displayed. Specifically, after selecting "Begin," a user may optionally rename the scan. The default scan name may be composed of the selected scan mode followed by a UTC timestamp. Renaming the scan will replace the default scan name.

Selecting and holding the "LAUNCH" button 1408 launces the aerial vehicle or drone to begin flight. In some embodiments, the aerial vehicle automatically climbs to a particular altitude (e.g., 16 ft) and hovers. Next, the graphical user interface as shown in FIG. 14F is displayed allowing a user to select a "Rally Point." Upon completing a scan, the aerial vehicle will return to the Rally Point. Additionally, when the battery level is low or the aerial vehicle loses connection, the aerial vehicle will return to the Rally Point. To set a Rally Point, a user can select one of the following options: "Use Launch Point" 1410 causes the aerial vehicle to return to the take-off location instead of a manually set Rally Point; or "Set Manually" 1412 allows a user to use the controller 104 to manually pilot the drone to a new location.

Next, a scan floor 1414 is set as shown in the graphical user interface of FIG. 14G. The scan floor 1414 defines the bottom of the 3D volume to be scanned. In some examples, the scan floor 1414 also defines the bottom of the scan in the visual geofence and the edge model viewer. If launching from the ground, the scan floor 1414 is automatically set to include the ground. In some examples, the graphical user interface may show a full-screen view of the scan floor 1414 augmented on a current view of a physical environment. For example, a horizontal plane may be presented in augmented reality (and in some implementations in a distinct color) overlaid on the view of the physical environment. A user may either drag the horizontal plane, a dot on the horizontal plane, or fly to a particular location to set the scan floor 1414. In some examples various buttons may be displayed on the graphical user interface: Move Floor—moves the location of the scan floor to the current altitude of the drone; Done—sets the scan floor in your desired location and proceeds to the next step; Level—moves the camera gimbal pitch to 0°; and Reset—sets the scan floor back to default.

After the scan floor is set, a scan ceiling 1416 is set as shown in the graphical user interface of FIG. 14H. The scan ceiling 1416 defines the top of the 3D volume to be scanned. In some examples, the scan ceiling 1416 also defines the top of the scan in the visual geofence and the edge model viewer. Generally, the scan ceiling 1416 is set above the structure that is to be scanned. In some examples a default ceiling is set at a particular distance above the launch point (or above the floor). In some examples a horizontal plane may be presented in augmented reality (and in some implementations in a distinct color) overlaid on the view of the physical environment. A user may either drag the horizontal plane, a dot on the horizontal plane, or fly to a particular location to set the scan ceiling 1416. In some examples various buttons may be displayed on the graphical user interface: Move Ceiling—moves the location of the scan ceiling to the current altitude of the drone; Done—Proceeds to the next step; Level—moves the camera gimbal pitch to 0°; and Reset—sets the scan ceiling to a default above the user-defined scan floor.

After the scan ceiling is set, lateral pillar boundaries may be set as shown in the graphical user interfaces of FIGS. 14I and 14J. As discussed herein, the lateral pillar boundaries are set to encompass the structure to be scanned. The lateral pillar boundaries may be presented in augmented reality (and in some implementations in a distinct color) overlaid on the view of the physical environment. In some examples the lateral pillars define the lateral bounds for a visual geofence. In some examples the lateral pillars define the lateral area of a model (of the scanned object) in an edge model viewer. The example of FIG. 14I shows a top view of a lateral pillar 1418 being set in augmented reality overlaid on the view of the physical environment. Similarly, FIG. 14J shows six boundary pillars 1420*a*-1420*e* being set overlaid on the view of the physical environment.

In some examples, to set pillars, a user may fly to a desired location and use a button (e.g., the right shoulder button) to select "Set Pillar." The user may continue placing pillars until the desired structure is encompassed. In some examples a minimum of three pillars must be set to create a three-dimensional (3D) volume, e.g., define the lateral bounds of a polygon around the 3D volume to be scanned. In some examples, edges of the polygon defined by the pillars must not cross each other in order to proceed. In some examples various buttons may be displayed on the graphical user interface; Set Pillar—adds a new bounding pillar; Undo—removes the previous bounding pillar; and Done—completes the step and sets the pillars where they have been added.

As discussed above, a visual geofence may be set which enables a strict geofence around the scan volume. In some examples, the visual geofence uses the aerial vehicle's visual navigation system to enter and exit the 3D volume from the same location. The aerial vehicle honors the visual geofence during the explore phase (or mode) and the scanning process (or mode), as well as when transitioning between the two processes (or modes). As shown in the graphical user interface of FIG. 14K, to set the visual geofence, a user may select "Edit Geofence" and may then independently toggle strict or default geofence settings: Ceiling, Floor, and Lateral as shown in the graphical user interface of FIG. 14L. By default, the aerial vehicle remains within a scan distance of the boundaries. Similarly, enabling a strict geofence blocks flight outside of the scan volume along that bound of the geofence. The aerial vehicle continues to enter and exit the scan volume through the same location.

A user may set an augmented reality (AR) observer point. The AR observer is the perspective from which a user may observe progress of a scan in augmented reality. The AR observer may be set in a number of ways. For example, the AR observer point may be set automatically. In such instances, "Review Suggestion" means that the aerial vehicle (or drone) will fly to the ceiling of the lateral pillar closest to the takeoff position. The drone will then face the structure (the centroid of the AR polygon-prism). Alternatively, the AR observer point may be set manually. Manually setting the AR observer point allows a user to manually pilot the drone to a preferred vantage point, using a controller (e.g., controller 104). If a user chooses to manually set the location of the AR Observer, the aerial vehicle may automatically ensure that the AR observer point provides the best situational awareness for monitoring the scan's progress. For example, the aerial vehicle may ensure that the AR observer point is no more than $10m$ from the scan volume and tightly frames the structure to be scanned. The aerial vehicle may also automatically ensure that the AR observer point fills the frame vertically and/or horizontally. Examples illustrating an implementation of graphical user interfaces for setting the AR observer point are shown in more detail in FIGS. 14M (view of scan in progress) and 14N (view showing setting the AR observer point). Specifically, FIG. 14M shows an aerial vehicle 1422 during a scan (in progress) from the perspective of the AR observer point as set in FIG. 14N. FIG. 14M also shows a toggle switch 1424 that allows a user to switch between a view of the scan from the static (or set) AR observer point and the aerial vehicle's current camera feed (or position) during the scan.

Once the scan parameters are set, the aerial vehicle will commence an "explore" phase or mode. In this step the aerial vehicle (or drone) briskly (e.g., 5.5 mph; 9 km/h) and autonomously flies around the scan volume to build an internal model of the structure being scanned. The aerial vehicle may use this internal model to intelligently predict overall scan time and number of capture points needed to complete the scan. The explore phase should be a small fraction of the total scan time, and a rough time estimate may be given as shown in the graphical user interface of FIG. 14O.

Next a user may review and or edit the scan setting (or parameters) as shown in the graphical user interface of FIG. 14P. As shown in FIG. 14P a summary of the scan settings may be shown including but not limited to estimates for the total scan time, number of batteries needed, total number of photos. The user may review the current settings and make any edits before the scan begins. Editing the scan settings impacts the total flight time, number of photos and the required number of batteries. The scan settings (or parameters) persist across scans. Selecting a reset button will restore settings to defaults. For example, selecting "Edit Settings" 1426 in the graphical user interface of FIG. 14P causes the graphical user interface of FIG. 14Q to be displayed with multiple sliders allowing a user to edit settings (or parameters).

Once the scan settings (or parameters) are finalized, a user may select "Begin Scan" 1428 to begin autonomously scanning the structure. FIG. 14R shows a graphical user interface showing the scanning in progress. During the scan a user may toggle on the augmented reality coverage mesh with a button 1430 to monitor the photo coverage progress. The augmented reality coverage mesh is shown and described in more detail with reference to FIGS. 15A and 15B. A user may pause at any point during the scan by taping the pause icon (or another button on the controller configured to pause). In some examples the aerial vehicle will display how many photos have been captured. Additionally, while paused, a user may manually capture photos using a button on the controller or an on-screen capture button. To resume autonomous scanning, a user selects a button on the controller or an icon on the screen.

Once the scan completes, the user may be given the option to manually capture more photos of the scene or details of specific areas of interest as shown in the graphical user interface of FIG. 14S. For example, a user may select a button on the controller to take a photo. Manual photos will show up in the scan folder and in the edge model viewer alongside the autonomously captured photos. As noted above, manual photos may be taken at any time by pressing pause. Additionally, a user may optionally enable interval mode to have the aerial vehicle take photos at pre-set different time intervals. FIG. 14T shows a graphical user interface for manual capture according to some examples.

Once the aerial vehicle finishes the scan, the aerial vehicle will return to the scan start point. From here, the user will have the option to start a new scan or return to the launch or rally point as shown in the graphical user interface of FIG. 14U. Starting a new scan will prompt the user with an option to save or discard the scan that just completed as shown in the graphical user interface of FIG. 14V. After landing, a user may be presented with a graphic user interface including a summary of the scan that just completed and the option to save the scan. A user may select save and wait for the drone to complete post-flight tasks including scan processing.

Figure 15A:
FIGS. 15A and 15B illustrate example graphical user interfaces for toggling an augmented reality mesh during a scan and during the explore stage respectively, according to some implementations.
Figure 15B:
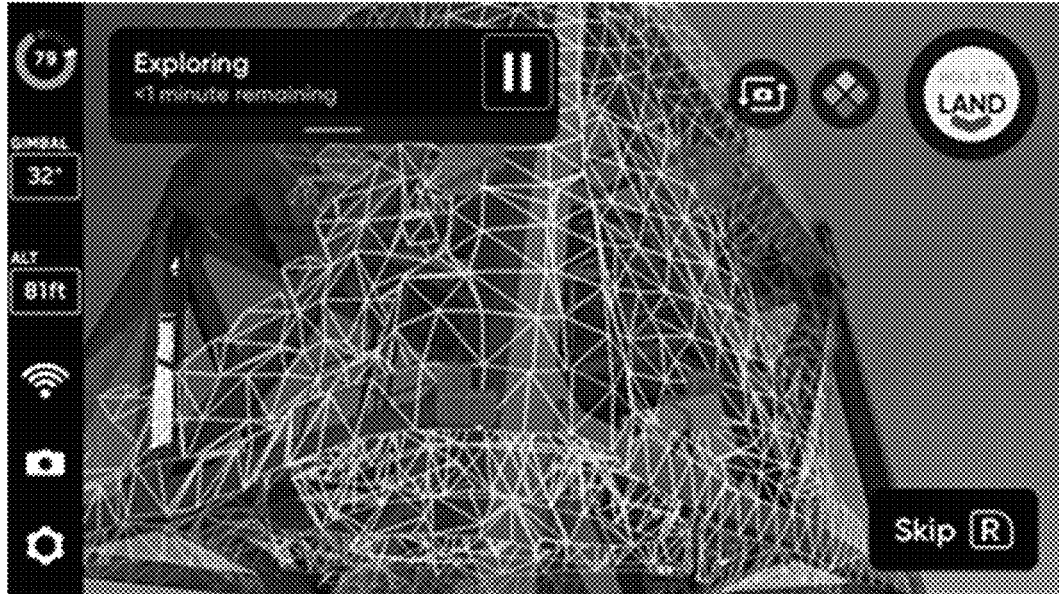

FIGS. 15A and 15B illustrate an implementation of example graphical user interfaces of autonomous flight control application on aerial vehicle controller according to some implementations. In this example, the controller 104 and/or the service computing device(s) 126 may present the graphical user interfaces for configuring parameters (or settings) for scanning a structure within three-dimensional (3D) scan volume. More specifically, the graphical user interfaces presented in FIGS. 15A and 15B show an example augmented reality mesh toggled on during a scan (FIG. 15A) and an augmented reality coverage mesh wireframe toggled on during the explore step (FIG. 15B).

As noted above, the augmented reality coverage mesh allows a user to monitor the photo coverage progress of the scan. For example, if a user taps the icon to display real-time AR photo coverage of your scan the graphical user interface similar to the graphical user interface of FIG. 15A may be displayed. The real-time AR photo coverage helps ensure coverage of key areas and can be enabled during the explore phase, live while scanning, when viewing the scan in the AR Observer, and/or during manual capture. In some examples a color may indicate coverage, e.g., yellow indicates minimal coverage and purple may indicates full coverage based on the selected overlap settings. Images are not captured during the explore phase, but the coverage mesh will show the low-poly map building process.

Figure 16:
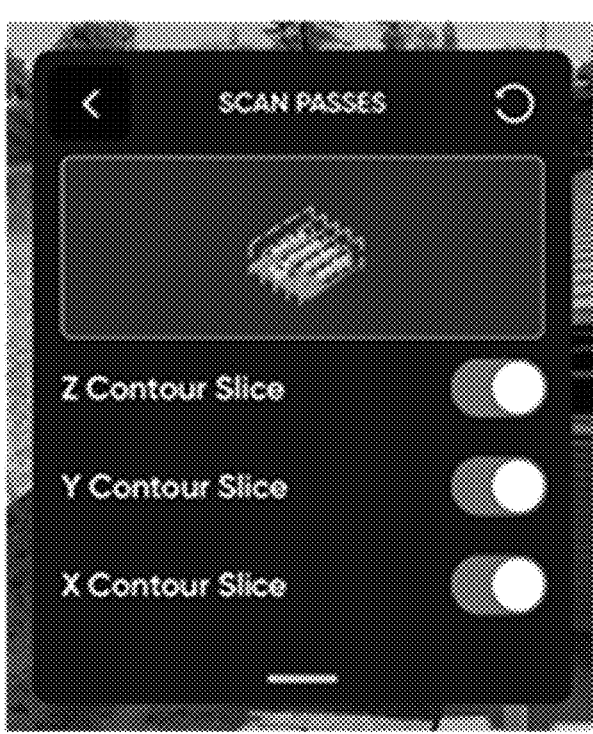
FIG. 16 illustrates a graphical user interface of an autonomous flight control application on aerial vehicle controller according to some implementations.

FIG. 16 illustrates a graphical user interface of an autonomous flight control application on aerial vehicle controller according to some implementations. In this example, the controller 104 and/or the service computing device(s) 126 may present the graphical user interfaces for configuring parameters (or settings) for scanning a structure within three-dimensional (3D) scan volume. For example, FIG. 16 illustrates a graphical user interface that allows a user to enable or disable slices. As discussed herein, the scanning organizes the capture path into three continuous slices Z, Y, and X. The Z slices are completed first and resemble orbits at fixed heights going around the structure. The X and Y slices follow and resemble a cross hatch pattern. By default, all three slices are enabled. A user has the option to independently toggle each of the scan slices as needed. If all three slices are disabled, the drone will enter manual capture mode.

Figure 17:
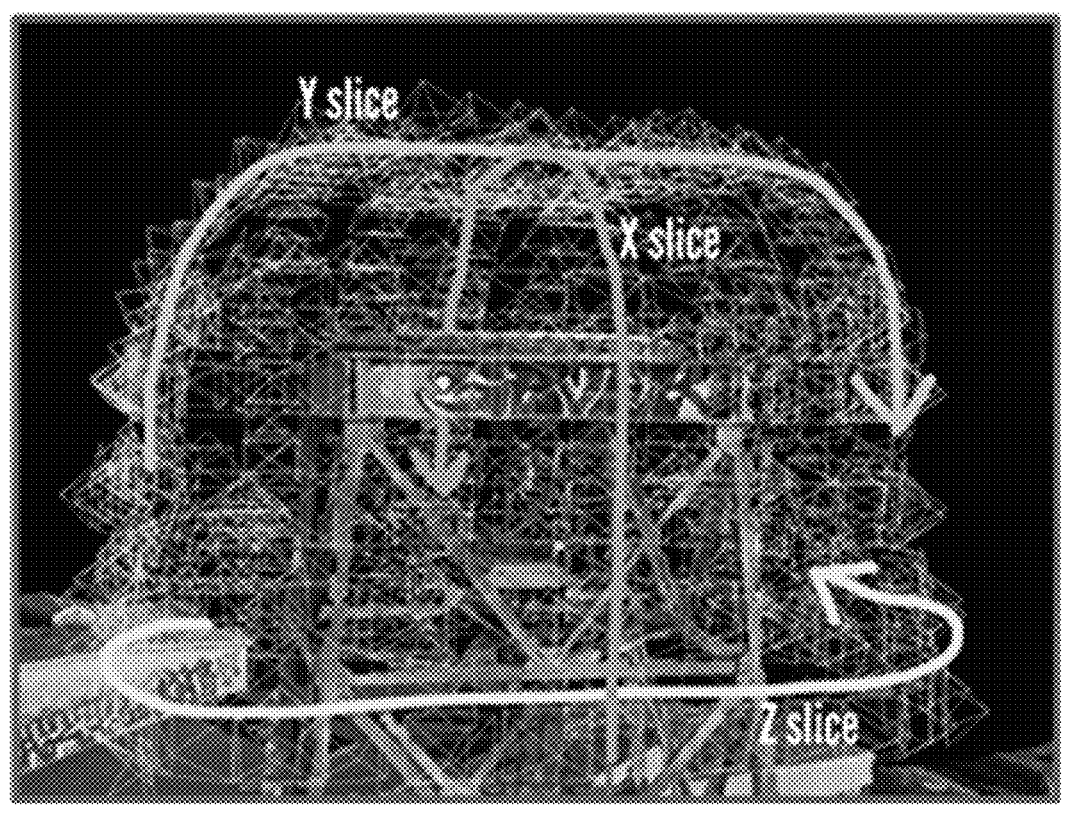
FIG. 17 illustrates an implementation of example image that shows the x, y and z slices according to some implementations.

FIG. 17 illustrates an implementation of example image that shows the x, y and z slices. The x and y pass fully loop around the structure to be scanned and capture photos from underneath.

FIG. 18 is a flow diagram illustrating an example process 1200 for scanning a scan target (or scan volume) according to some implementations. In some examples, at least a portion of the process 1200 may be executed by a computing device that is remote from the UAV 102, such as the controller 104 and/or the service computing device(s) 126. Alternatively, in some examples, at least a portion of the process 500 may be performed by the UAV 102, such as by executing a scanning program and vehicle control program.

At 1802, a graphical user interface (GUI) is continually presented that includes a display of a current view of the physical environment from a perspective of an aerial vehicle. The current view is generated based on sensor data from a sensor device onboard the aerial vehicle.

At 1804, user interactions with the GUI are detected while the aerial vehicle is in flight. The user interactions may include instructions directing the aerial vehicle to maneuver within the physical environment and configure parameters for scanning a three-dimensional (3D) scan volume. In some examples, the user interactions include instructions directing the aerial vehicle to set a rally point. For example, the instructions to set the rally point may include instructions to maneuver the aerial vehicle to a particular location within the physical environment and set the rally point at the particular location.

In some examples, the user interactions include instructions to set a scan floor. For example, the instruction to set the scan floor may include instructions to present a horizontal plane in augmented reality (AR) overlaid on the view of the physical environment. The user interactions with the GUI may be operable to adjust the horizontal plane and set the scan floor. Alternatively or additionally, the instructions to set the scan floor may include instructions to maneuver the aerial vehicle to a particular altitude within the physical environment and set the scan floor at the particular altitude.

In some examples, the user interactions include instructions to set a scan ceiling. For example, the instructions to set the scan ceiling may include instructions to present a horizontal plane in augmented reality (AR) overlaid on the view of the physical environment. The user interactions with the GUI may be operable to adjust the horizontal plane and set the scan ceiling.

Alternatively or additionally, the instructions to set the scan ceiling may include instructions to maneuver the aerial vehicle to a particular altitude within the physical environment and set the scan ceiling at the particular altitude.

In some examples, the user interactions include instructions set multiple lateral pillar boundaries. The instructions to set the multiple lateral pillar boundaries may include instructions to maneuver the aerial vehicle to at least three physical locations within the physical environment. In such instance, each physical location may define a lateral pillar boundary of the multiple lateral pillar boundaries and the multiple lateral pillar boundaries may comprise a polygon that defines lateral bounds of a visual geofence.

In some examples, the aerial vehicle is directed to stay within the visual geofence within a strictness level while performing the 3D scan. The instructions may include instructions to detect additional user interactions with the GUI while the aerial vehicle is in flight. In such instances, the additional user interactions may include instructions directing the aerial vehicle to dynamically adjust the strictness level of the visual geofence.

In some examples, the instructions for performing the 3D scan of the 3D scan volume may include instructions for directing the aerial vehicle to enter and exit the 3D scan volume at the same location.

In some examples, the user interactions for performing the 3D scan of the 3D scan volume may include instructions to set a fixed perspective from which to observe progress of the 3D scan in augmented reality (AR). For example, the instructions may include continually presenting a coverage mesh in augmented reality (AR) overlaid on the view of the physical environment from the fixed perspective. The coverage mesh may include a plurality of contour paths spaced apart from each other along at least one axis associated with the 3D scan volume. Alternatively or additionally, the coverage mesh may depict photo coverage progress of the 3D scan volume.

Lastly, at 1806, data encoding the instructions for performing a 3D scan of the 3D scan volume are transmitted to the aerial vehicle.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A computing apparatus comprising:

one or more non-transitory computer-readable storage media; and program instructions stored on the one or more computer-readable storage media that, when executed by one or more processors, direct the computing apparatus to at least:

continually present a graphical user interface (GUI) at the computing apparatus, the GUI including a display of a current view of a physical environment from a perspective of an aerial vehicle, wherein the current view is generated based on sensor data from a sensor device onboard the aerial vehicle;

detect user interactions with the GUI while the aerial vehicle is in flight, the user interactions including instructions directing the aerial vehicle to:

maneuver within the physical environment, and configure parameters for a three-dimensional (3D) scan of a 3D scan volume, the parameters including at least one parameters for setting a fixed perspective from which to observe progress of the 3D scan in augmented reality;

transmit, to the aerial vehicle, data encoding the instructions for performing the 3D scan of the 3D scan volume; and continually present, from the fixed perspective, a coverage mesh in augmented reality overlaid on a view of the physical environment, wherein the coverage mesh includes a plurality of contour paths spaced apart from each other along at least one axis associated with the 3D scan volume, wherein the coverage mesh visually depicts photo coverage progress of the 3D scan volume as a function of completed image capture by the aerial vehicle, and wherein the coverage mesh dynamically updates in real-time based on the sensor data received from the aerial vehicle indicating actual progress of the 3D scan.

2. The computing apparatus of claim 1, wherein the user interactions including instructions directing the aerial vehicle to maneuver within the physical environment and configure parameters for scanning the 3D scan volume include instructions to set a rally point.

3. The computing apparatus of claim 2, wherein the instructions to set the rally point include instructions to:

maneuver the aerial vehicle to a particular location within the physical environment; and set the rally point at the particular location.

4. The computing apparatus of claim 1, wherein the user interactions including instructions directing the aerial vehicle to maneuver within the physical environment and configure parameters for scanning the 3D scan volume include instructions to set a scan floor.

5. The computing apparatus of claim 4, wherein the program instructions, when executed by the one or more processors, direct the computing apparatus to:

present a horizontal plane in augmented reality overlaid on the view of the physical environment, and wherein the user interactions with the GUI are operable to adjust the horizontal plane and set the scan floor.

6. The computing apparatus of claim 4, wherein the instructions to set the scan floor include instructions to:

maneuver the aerial vehicle to a particular altitude within the physical environment; and set the scan floor at the particular altitude.

7. The computing apparatus of claim 1, wherein the user interactions including instructions directing the aerial vehicle to maneuver within the physical environment and configure parameters for scanning the 3D scan volume include instructions to set a scan ceiling.

8. The computing apparatus of claim 7, wherein the program instructions, when executed by the one or more processors, direct the computing apparatus to:

present a horizontal plane in augmented reality overlaid on the view of the physical environment, and wherein the user interactions with the GUI are operable to adjust the horizontal plane and set the scan ceiling.

9. The computing apparatus of claim 7, wherein the instructions to set the scan ceiling include instructions to:

maneuver the aerial vehicle to a particular altitude within the physical environment; and set the scan ceiling at the particular altitude.

10. The computing apparatus of claim 1, wherein the user interactions including instructions directing the aerial vehicle to maneuver within the physical environment and configure parameters for scanning the 3D scan volume include instructions to set multiple lateral pillar boundaries, wherein the instructions to set the multiple lateral pillar boundaries include instructions to maneuver the aerial vehicle to at least three physical locations within the physical environment, wherein each physical location defines a lateral pillar boundary of the multiple lateral pillar boundaries, and wherein the multiple lateral pillar boundaries comprise a polygon that defines lateral bounds of a visual geofence.

11. The computing apparatus of claim 10, wherein the aerial vehicle is directed to stay within the visual geofence within a threshold strictness level while performing the 3D scan.

12. The computing apparatus of claim 11, wherein the program instructions when executed by one or more processors, further direct the computing apparatus to at least:

detect additional user interactions with the GUI while the aerial vehicle is in flight, the additional user interactions including instructions directing the aerial vehicle to dynamically adjust the strictness level of the visual geofence.

13. The computing apparatus of claim 1, wherein the program instructions for performing the 3D scan of the 3D scan volume includes instructions for directing the aerial vehicle to enter and exit the 3D scan volume at the same location.

14. The computing apparatus of claim 1, wherein the user interactions include instructions directing the aerial vehicle to further maneuver within the physical environment.

15. A computing apparatus comprising:

one or more non-transitory computer-readable storage media; and program instructions stored on the one or more computer-readable storage media that, when executed by one or more processors, direct the computing apparatus to at least:

continually present a graphical user interface (GUI) at the computing apparatus, the GUI including:

a display of a current view of a physical environment from a perspective of an aircraft, the current view generated based on sensor data from a sensor device onboard the aircraft; and an augmented reality (AR) coverage mesh overlaid on the current view from a fixed perspective, the AR coverage mesh including a plurality of spaced-apart contour paths associated with a scan volume;

detect user interactions with the GUI while the aircraft is in flight, the user interactions including instructions to:

configure a scan of a three-dimensional (3D) scan volume; and set one or more scan parameters including a fixed virtual camera perspective from which to observe progress of the scan in augmented reality;

transmit, to the aircraft, data encoding the instructions to perform the scan of the 3D scan volume; and dynamically update the AR coverage mesh in real-time based on the sensor data received from the aircraft indicating actual image capture progress, wherein the AR coverage mesh visually distinguishes between scanned and unscanned regions of the scan volume.

16. The computing apparatus of claim 15, wherein the program instructions when executed by the one or more processors, further direct the computing apparatus to at least:

continually present at least three pillars of a polygon that defines lateral bounds of a geofence in augmented reality overlaid on a view of the physical environment from a preset perspective of the aircraft, wherein edges of the polygon encompass a structure to be scanned.

17. A method comprising:

continually presenting a graphical user interface (GUI) at a computing apparatus, the GUI including a display of a current view of a physical environment from a perspective of an aerial vehicle, wherein the current view is generated based on sensor data from a sensor device onboard the aerial vehicle;

detecting user interactions with the GUI while the aerial vehicle is in flight, the user interactions including instructions directing the aerial vehicle to:

maneuver within the physical environment, and configure parameters for a three-dimensional (3D) scan of a 3D scan volume, the parameters including at least one parameter for setting a fixed perspective from which to observe progress of the 3D scan in augmented reality;

transmitting, to the aerial vehicle, data encoding the instructions for performing the 3D scan of the 3D scan volume; and continually presenting, from the fixed perspective, a coverage mesh in augmented reality overlaid on a view of the physical environment, wherein the coverage mesh includes a plurality of contour paths spaced apart from each other along at least one axis associated with the 3D scan volume, wherein the coverage mesh visually depicts photo coverage progress of the 3D scan volume, and wherein the coverage mesh dynamically updates in real-time based on the sensor data received from the aerial vehicle indicating actual progress of the 3D scan.

18. The method of claim 17, wherein the user interactions including instructions directing the aerial vehicle to maneuver within the physical environment and configure parameters for scanning the 3D scan volume include instructions to set a rally point.

19. The method of claim 18, wherein the instructions to set the rally point include instructions to:

maneuver the aerial vehicle to a particular location within the physical environment; and set the rally point at the particular location.

20. The method of claim 17, wherein the user interactions including instructions directing the aerial vehicle to maneuver within the physical environment and configure parameters for scanning the 3D scan volume include instructions to set a scan floor.

21. The computing apparatus of claim 1, wherein the fixed perspective is defined by user input provided via the GUI.

22. The computing apparatus of claim 1, wherein the coverage mesh is color-coded or shaded to distinguish scanned regions from unscanned regions.

23. The computing apparatus of claim 1, wherein the GUI further presents a scan floor, ceiling, and lateral boundaries of the 3D scan volume as adjustable AR overlays.

24. The computing apparatus of claim 1, wherein the sensor data comprises geotagged metadata and pose estimates associated with captured images.

* * * * *